(12) United States Patent
Ishizawa et al.

(10) Patent No.: US 9,915,761 B2
(45) Date of Patent: Mar. 13, 2018

(54) OPTICAL SYSTEM HAVING OPTICAL THIN FILM INCLUDING AMORPHOUS SILICON OXIDE-BASED BINDER

(71) Applicant: NIKON CORPORATION, Chiyoda-ku, Tokyo (JP)

(72) Inventors: Hitoshi Ishizawa, Kawasaki (JP); Shunsuke Niisaka, Fujisawa (JP); Tsuyoshi Murata, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/834,309

(22) Filed: Aug. 24, 2015

(65) Prior Publication Data

US 2015/0362633 A1 Dec. 17, 2015

Related U.S. Application Data

(60) Division of application No. 13/293,718, filed on Nov. 10, 2011, now abandoned, which is a continuation of
(Continued)

(30) Foreign Application Priority Data

Sep. 16, 2004 (JP) .................................. 2004-269719
Dec. 24, 2004 (JP) .................................. 2004-373158

(51) Int. Cl.
*G02B 1/10* (2015.01)
*G02B 1/116* (2015.01)
(Continued)

(52) U.S. Cl.
CPC ............ *G02B 1/116* (2013.01); *C03C 17/007* (2013.01); *G02B 1/111* (2013.01); *G02B 1/113* (2013.01);
(Continued)

(58) Field of Classification Search
CPC .. G02B 1/10; G02B 1/11; G02B 1/113; G02B 1/118; G02B 27/0018; G02B 2207/107
(Continued)

(56) References Cited

U.S. PATENT DOCUMENTS 2,601,123 A 4/1947 Moulton
4,024,143 A 5/1977 Schuman et al.
(Continued)

FOREIGN PATENT DOCUMENTS

EP 0 416 119 A1 3/1991
EP 0 468 423 A 1/1992
(Continued)

OTHER PUBLICATIONS

Extended European Search Report dated Jan. 27, 2016, in European Patent Application No. 15186323.0.
(Continued)

*Primary Examiner* — Arnel C Lavarias
(74) *Attorney, Agent, or Firm* — Shapiro, Gabor and Rosenberger, PLLC

(57) ABSTRACT

An $MgF_2$ optical thin film is formed on an optical surface of a base material. The $MgF_2$ optical thin film includes $MgF_2$ particles and an amorphous silicon oxide-based binder which exists on the surfaces of the $MgF_2$ particles and between the $MgF_2$ particles. Owing to this amorphous silicon oxide-based binder, the optical thin film can have high mechanical strength and high adhesion to the base material, while having excellent environment resistance and a lower refractive index.

17 Claims, 11 Drawing Sheets

Related U.S. Application Data application No. 12/968,268, filed on Dec. 14, 2010, now abandoned, which is a division of application No. 11/662,892, filed as application No. PCT/JP2005/017015 on Sep. 15, 2005, now abandoned.

(51) Int. Cl.

| | | |
|---|---|---|
| *C03C 17/00* | (2006.01) | |
| *G02B 1/111* | (2015.01) | |
| *G02B 1/113* | (2015.01) | |
| *G02B 1/118* | (2015.01) | |
| *G02B 1/14* | (2015.01) | |

(52) U.S. Cl.
CPC ............. G02B 1/118 (2013.01); G02B 1/14 (2015.01); *C03C 2217/45* (2013.01); *C03C 2217/475* (2013.01); *C03C 2218/113* (2013.01); *G02B 2207/107* (2013.01); *G02B 2207/109* (2013.01); *Y10T 428/2495* (2015.01); *Y10T 428/258* (2015.01)

(58) Field of Classification Search
USPC ....... 359/580, 581, 582, 586, 589, 590, 601, 359/603, 609; 427/372.2; 428/213; 516/9; 313/478
See application file for complete search history.

(56) References Cited

U.S. PATENT DOCUMENTS

| | | | |
|---|---|---|---|
| 5,085,888 A | 2/1992 | Morimoto et al. | |
| 5,189,337 A | 2/1993 | Endo et al. | |
| 5,193,028 A | 3/1993 | Noguchi | |
| 5,243,255 A | 9/1993 | Iwasaki | |
| 5,281,893 A | 1/1994 | Matsuda et al. | |
| 5,316,996 A | 5/1994 | Itoh | |
| 5,412,278 A | 5/1995 | Iwasaki | |
| 5,446,339 A | 8/1995 | Kinoshita et al. | |
| 5,993,898 A | 11/1999 | Nagatsuka | |
| 6,337,032 B1 | 1/2002 | Chivukula et al. | |
| 6,574,039 B1 * | 6/2003 | Murata | B82Y 10/00 355/67 |
| 6,726,814 B2 | 4/2004 | Ohmi et al. | |
| 6,950,236 B2 | 9/2005 | Hokazono et al. | |
| 2002/0105721 A1 | 8/2002 | Paul et al. | |
| 2002/0191168 A1 | 12/2002 | Ishizawa et al. | |
| 2005/0225878 A1 | 10/2005 | Tanaka et al. | |
| 2006/0291060 A1 | 12/2006 | Shirai et al. | |
| 2008/0261053 A1 | 10/2008 | Arndt et al. | |

FOREIGN PATENT DOCUMENTS

| | | |
|---|---|---|
| EP | 0 585 819 A1 | 3/1994 |
| JP | 62-124503 | 6/1987 |
| JP | 2-264901 | 10/1990 |
| JP | 4-82145 | 3/1992 |
| JP | 4-282539 | 10/1992 |
| JP | 7-48527 | 2/1995 |
| JP | 7-69621 | 3/1995 |
| JP | 7-134955 | 5/1995 |
| JP | 8-122501 | 5/1996 |
| JP | 11-6902 | 1/1999 |
| JP | 2000-169133 | 6/2000 |
| JP | 3272111 | 1/2002 |
| JP | 2005-001900 A | 1/2005 |
| WO | WO 01/23914 | 4/2001 |
| WO | WO 02/18982 | 3/2002 |
| WO | WO 2005/120154 A3 | 12/2002 |
| WO | WO 2005/120154 A2 | 12/2005 |

OTHER PUBLICATIONS

Notice of Reasons for Rejection dated Jun. 28, 2011, in Japanese Patent Application No. 2006-535192.
Communication dated Jul. 30, 2012 in European Patent Application No. 05 783 252.9.
Office Action dated Apr. 10, 2013, in Taiwanese Patent Application No. 094131959.
Non-Final Office Action dated Sep. 14, 2010, in U.S. Appl. No. 11/662,892.
Non-Final Office Action dated Apr. 18, 2011, in U.S. Appl. No. 12/968,268.
Final Office Action dated Aug. 10, 2011, in U.S. Appl. No. 12/968,268.
Extended European Search Report from European Patent Application No. 13171132.7, dated Jan. 27, 2014.
English translation of International Search Report from International Application No. PCT/JP2005/071015, dated Jan. 17, 2006.
A. Rywak et al., "Sol-Gel Synthesis of Nanocrystalline Magnesium Flouride: Its Use in the Preparation of $MgF_2$ Films and $MgF_2$—$SiO_2$ Composites," Chem. Mater., vol. 8, No. 1, 1996, pp. 60-67.
I. Thomas, "Porous fluoride antireflective coatings," Applied Optics, vol. 27, No. 16, Aug. 15, 1988, pp. 3356-3358.
Office Action dated Apr. 5, 2011 in Japanese Patent Application No. 2006-535192.
Written Opinion of the ISA in International Patent Application No. PCT/JP2005/017015, dated Jul. 5, 2010.
Communication dated Jun. 9, 2011, in European Patent Application No. 05 783 252.9.
F. L. Pedrotti, L. S. Pedrotti, 'Introduction to Optics', Prentice Hall, New Jersey, 1993, pp. 391-406.
International Search Report from International Application No. PCT/JP2005/071015, dated Jan. 17, 2006.
Summons to Attend Oral Proceedings dated May 11, 2015, in European Patent Application No. 05783252.9.
Office Action dated May 6, 2015, in European Patent Application No. 13171132.7.

* cited by examiner

OPTICAL SYSTEM HAVING OPTICAL THIN FILM INCLUDING AMORPHOUS SILICON OXIDE-BASED BINDER

CROSS-REFERENCE TO RELATED APPLICATION

This application is a continuation of U.S. patent application Ser. No. 12/968,268 filed Dec. 14, 2010, which is a division of U.S. patent application Ser. No. 11/662,892 filed Mar. 15, 2007, which is a 371 of International Patent Application No. PCT/JP2005/017015 filed Sep. 15, 2005.

TECHNICAL FIELD

The present invention relates to a singlelayered or multilayered optical thin film formed of $MgF_2$, a method for producing the same, an optical element having the $MgF_2$ optical thin film, and an optical system for optical instruments such as cameras, microscopes, binoculars, and exposure apparatuses which is provided with the optical element.

BACKGROUND ART

Surfaces of individual lenses, which construct an optical system such as a camera lens and an objective lens of a microscope, are coated with an antireflection film in order to reduce the reflection. In general, the optical thin film such as the antireflection film is produced by the dry method (dry process), in which the vacuum vapor deposition method, the sputtering method, the CVD method (Chemical Vapor Deposition) or the like is used.

In order to obtain a high performance optical thin film having a low reflectance in a wide wavelength band or a wide angle band, it is known that a multilayered film is appropriately formed by combining a plurality of coating materials having different refractive indexes. Usually, when an antireflection film is formed by the dry process, then $TiO_2$ (refractive index: 2.4 to 2.7 at 500 nm) is usually utilized as the maximum refractive index material, and $MgF_2$ (refractive index: 1.38 at 500 nm) is utilized as the minimum refractive index material.

The following fact is known for the multilayered film. That is, when the difference in the refractive index between the coating materials to be used is larger, or when a low refractive index film is used at the uppermost layer, then the optical performance is improved, and/or the number of coating layers can be decreased even when the optical performance is same. In particular, it has been clarified by the simulation that the optical performance can be extremely enhanced, when only the uppermost layer is composed of a low refractive index film having a refractive index of not more than 1.30. That is, the low refractive index film, in which the uppermost layer has a refractive index of not more than 1.30, is effective for the realization of the wide band in which the reflectance can be suppressed to be low over a wide wavelength region. Further, the low refractive index film is also extremely effective for the realization of the wide incidence in which the reflectance can be suppressed to be low not only for the direct or normal incoming (incident) light but also for the light allowed to come in a wide angle range. Therefore, a technique is required, in which the optical thin film having a refractive index of not more than 1.30 can be produced.

In order to lower the refractive index of the film, it is effective that the structure of the film is porous rather than dense. In general, it is defined that the film has a structure of a plurality of minute holes or pores which separate the deposited solid substance. Therefore, the relationship between the packing density and the refractive index of the film is as follows.

$$n_f = n_o \times P + n_p \times (1-P)$$

In this expression, $n_p$ represents the refractive index of the substance (for example, air or water) with which the minute holes are filled, $n_f$ and $n_o$ represent the actual refractive index (depending on the packing density) and the refractive index of the deposited solid material respectively, and P represents the packing density of the film. Further, the packing density is defined as follows.

$$P = \text{(volume of solid portion of film)/(total volume of film (solid portion+minute hole portion))}$$

Thus, the high and low the packing densities mean the high and low the refractive indexes respectively.

In general, the dry process such as the vapor deposition and the sputtering is suitable in order to obtain the dense film. However, the wet method (wet process) is suitable in order to obtain the porous film. The wet process is such a method that the film is formed by coating the substrate with the liquid by, for example, the spin coat method, the dip method, the spray method, and the roll coat method, followed by being dried and heat-treated. The feature of the wet process is exemplified such that any large-sized apparatus is not required, unlike the dry process, and that the film can be formed in the atmospheric air. Therefore, it is possible to greatly lower the cost. For example, in the case of the lens having a small radius of curvature, it is difficult to uniformly effect the coating of the optical thin film by the dry process such as the vacuum vapor deposition method and the sputtering method. However, the uniform coating can be performed relatively easily in the case of the wet process such as the spin coat method. In this case, the film can be formed uniformly on a surface having a large areal size and on a curved surface having a small radius of curvature as well.

International Publication No. 02/18982A1 discloses a method for producing a porous $MgF_2$ film by the wet process. In this method, a sol solution of $MgF_2$ is heat-treated at a high temperature and a high pressure to thereby effect the grain growth and the crystallization of $MgF_2$ minute particles, which is thereafter subjected to the coating to form the film. According to this method, even when the film is formed by depositing the $MgF_2$ minute particles, the pores, which exist between the minute particles, are not crushed, and the high porosity is secured. As a result, the film is porous. It is possible to extremely lower the refractive index as compared with any dense film produced by the dry process. However, the following problem arises. That is, the mechanical strength of the obtained porous film is low, and the adhesive force is low with respect to the substrate, and that when the manual wiping is performed, the porous film is exfoliated.

A large number of techniques are known in order to improve the film strength and the adhesive force of the porous films based on the use of various types of minute particles. For example, Japanese Patent No. 3272111 discloses a technique for reinforcing or enhancing an antistatic film composed of $SnO_2$ minute particles with which a surface of a cathode ray tube is coated. In this technique, a sufficient strength is given to an $SnO_2$ film by forming an $SiO_2$ film on the $SnO_2$ film by the wet process. However, the refractive index is not lowered sufficiently, because the dense $SnO_2$ film is formed at the uppermost layer.

A technique is disclosed in Japanese Patent Application Laid-open No. 11-6902 as an example of the techniques for reinforcing a porous film itself, in which the porous film composed of inorganic minute particles is reinforced with a polymer binder. In this technique, it is possible to reinforce the film itself. However, the refractive index of the film cannot be lowered to be not more than 1.30, because the refractive index of the polymer is relatively high.

Japanese Patent Application Laid-open Nos. 7-48527 and 8-122501 disclose a technique in which a porous film composed of $SiO_2$ minute particles is reinforced with a binder of alkoxysilane. The film itself can be also reinforced in the case of this technique. However, $SiO_2$ has a property to easily adsorb the water content in the air. Further, the film is porous, which has a large surface area. For this reason, the large wavelength shift is caused. Therefore, the film can be used as an antireflection film for display devices. However, it is difficult to use the film for any precision optical instrument such as cameras, microscopes and the like.

There is such a possibility that the wavelength shift can be suppressed by using a sol described, for example, in Japanese Patent Application Laid-open No. 2000-169133. This document describes, as a coating agent, the sol of composite colloid particles of 5 to 50 nm in which colloidal silica and $MgF_2$ hydrate are coagulated. Although there is no description about the film in Japanese Patent Application Laid-open No. 2000-169133, when any film is formed, the wavelength shift is hardly caused because $MgF_2$ has a property to hardly adsorb the water content. However, in the case of the sol as described above, it is not necessarily affirmed that the sol is excellent in the environment resistance, because the sol contains the unstable $MgF_2$ hydrate which is not pure $MgF_2$.

In recent years, the optical system is increasingly complex and versatile, as the required performance is enhanced. For example, the number of lenses is increased, for example, in order to maximally chase the aberration to the limit or in order to increase the zoom magnification. It is also necessary to provide such a design that the angle of incidence of the light beam into the lens surface is increased. Further, as the digital camera comes to the front in recent years, for example, the element, which has been the film, is progressively replaced with the image pickup device such as CCD and CMOS.

When the change of the optical system is assessed from a viewpoint of the surface reflection of the lens or the like, the increase in the number of lenses is directly the increase in the number of reflecting surfaces. The antireflection film is applied in ordinary cases. However, the possibility is increased that the ghost and flare are caused due to the residual reflection, and the transmittance is lowered as well. As for the increase in the angle of incidence, in principle, there is such a tendency that the surface reflection is increased as the incidence is effected more obliquely, irrelevant to the presence or absence of the antireflection film, which makes the cause of the ghost and the flare. The reflection of the image pickup device has not been hitherto considered. It is pointed out that the reflected light is returned to the optical system to cause the flare and the ghost. The ghost and the flare cause the decrease in the contrast and the deterioration of the color tone, and they cause the disappearance of the image in the worst case, which are of course unfavorable.

The antireflection film, which is generally used at present, is initially a singlelayered antireflection film. However, the singlelayered antireflection film is changed to the multilayered antireflection film in order to widen the wavelength band or zone. As the production technique is improved, the antireflection film is sufficiently investigated and contrived, for example, such that the antireflection characteristic is adjusted. The optical design is progressively contrived as well, for example, such that the angle of incidence is restricted or limited so that various problems are not caused, in consideration of the proper arrangement of the antireflection film. As a result, a lens, which involves less problems to some extent, is completed (see Japanese Patent Application Laid-open No. 62-124503).

However, such a lens is established on the sacrifice of the degree of freedom of the optical design. As the high performance is required and/or the new element or device such as CCD is used as described above, it is recognized that the performance of the conventional antireflection film is insufficient.

DISCLOSURE OF THE INVENTION

Problems to be Solved by the Invention

However, in the case of the film using $MgF_2$ as described in International Publication No. 02/18982A1, the film strength and the adhesive force with respect to the base material are insufficient, although the refractive index of the optical thin film can be lowered to be not more than 1.30. In the case of the films in which the film strength and the adhesive force with respect to the base material can be secured as described in Japanese Patent No. 3272111, Japanese Patent Application Laid-open No. 11-6902, Japanese Patent Application Laid-open No. 7-48527, Japanese Patent Application Laid-open No. 8-122501 and Japanese Patent Application Laid-open No. 2000-169133, the problem arises such that the refractive index of the film cannot be lowered sufficiently, and the environment resistance is insufficient. There has been the problem such that it is not possible to obtain any optical thin film which is capable of sufficiently decreasing the refractive index and of securing the mechanical strength of the film, the adhesive force with respect to the base material, and the environment resistance.

When the dry process such as the vapor deposition method is used, the coating can be performed with the multilayer antireflection film in which high refractive index films and low refractive index films are alternately stacked. However, in the case of the wet process, it is difficult to perform the multilayered coating. Therefore, when the film is formed by the wet process, the antireflection film having the single layer is generally formed. In the case of the single layer, the reflectance can be theoretically made 0% when the refractive index of the film is the square root of the refractive index of the substrate.

Therefore, if the refractive index of the antireflection film can be finely changed for a variety of optical glasses having different refractive indexes, it is possible to produce, for example, a camera lens and an objective lens having the excellent performance. A technique is required, in which the refractive index of the film is adjusted in response to the materials of the lenses having various refractive indexes.

In order to adjust the refractive index of the film, the following procedure is easily adopted. That is, a film, which is porous and which has a low refractive index, is used as a base, and the porous film is densified so that the refractive index is adjusted to be high. On the contrary, if it is intended to lower the refractive index by providing a porous property to a film which is dense and which has a high refractive index, there is such a high possibility that the film itself may be collapsed (destroyed). Therefore, such a procedure is extremely difficult to be executed. Therefore, a porous film, in which the refractive index is sufficiently lowered, is especially required in order to adjust the refractive index as well.

In the case of the film using $MgF_2$ as the porous film in which the refractive index is sufficiently lowered as described in International Publication No. 02/18982A1, it is possible to improve the bonding force between the minute particles so that the strength of the film itself and the adhesive force with respect to the substrate can be improved by heat-treating the porous $MgF_2$ film at a high temperature. However, no remarkable effect can be obtained unless the heat treatment is performed at a temperature of not less than 300° C. Therefore, the following possibility arises. That is, the film can have a dense property due to the heat treatment of the porous film at the high temperature, the refractive index can be increased, and the fluorine of the fluoride may be liberated and changed into any oxide. Further, when the substrate undergoes the high temperature, then the accuracy of the optically polished surface is changed, the refractive index is changed, and the substrate is broken in some cases when the substrate has the low heat resistance.

The realization of the wide band can be achieved at most by introducing the multilayered structure, in the case of the design and the process having been hitherto used for the optical thin film. In such circumstances, it is almost impossible to absolutely realize the low reflectance and reduce the reflection at high angles of incidence while maintaining the band.

In view of the above, a first object of the present invention is to provide an $MgF_2$ optical thin film which has the high mechanical strength, which has the high adhesive force with respect to a substrate, which is excellent in the environment resistance, and which provides the lower refractive index with ease.

A second object of the present invention is to provide a production method in which such an $MgF_2$ optical thin film can be produced with ease and to provide an $MgF_2$ sol solution which is suitable for the production method.

Additionally, a third object of the present invention is to provide a method for producing an $MgF_2$ optical thin film in which the refractive index of the $MgF_2$ optical thin film can be adjusted with ease.

Further, a fourth object of the present invention is to provide a multilayered antireflection film, an optical element, and an optical system in which the absolutely low reflectance can be realized and the reflection can be reduced at higher angles of incidence while maintaining the realization of the wide band.

Means for Solving the Problem and Effect of the Invention

According to a first aspect of the present invention, there is provided an $MgF_2$ optical thin film, comprising $MgF_2$ minute particles; and an amorphous silicon oxide-based binder which exists between the $MgF_2$ minute particles.

According to the present invention, the $MgF_2$ minute particles, which are excellent in the environment resistance (durability), are used as the main constitutive substance of the film, and the $MgF_2$ minute particles are bonded or connected to one another by the amorphous silicon oxide-based binder. Therefore, the strong bonding or connection can be provided between the $MgF_2$ minute particles and between the $MgF_2$ minute particles and the base material. The mechanical strength of the film and the adhesive force between the film and the base material are improved. That is, it is considered that the $MgF_2$ optical thin film has such a structure that the voids (gaps) are present between the $MgF_2$ minute particles, and the voids are filled with the amorphous silicon oxide-based binder. $SiO_2$, which is somewhat inferior in the environment resistance, can be used as the amorphous silicon oxide-based binder. However, it is enough to use a small amount of the binder as compared with the $MgF_2$ minute particles. Therefore, it is possible to sufficiently secure the environment resistance as the entire thin film.

In the $MgF_2$ optical thin film of the present invention, the $MgF_2$ minute particles may be connected by the amorphous silicon oxide-based binder, and the amorphous silicon oxide-based binder, disposed on surfaces of $MgF_2$ minute particles, among the $MgF_2$ minute particles, which exist at an outermost portion of the $MgF_2$ optical thin film, may have a thickness which is not more than 5% of a wavelength of light to be radiated. Further, in the $MgF_2$ optical thin film of the present invention, the amorphous silicon oxide-based binder, which exists between adjacent $MgF_2$ minute particles, among the $MgF_2$ minute particles, may have a thickness which is smaller than a particle diameter of the $MgF_2$ minute particles. When the thickness of the binder is adjusted as described above, it is possible to lower the refractive index. In particular, when the refractive index of the outermost layer of the optical thin film is sufficiently lowered, the antireflection film is obtained, which has the low reflectance in a wide wavelength band or zone and in a wide angle band or zone.

In the present invention, it is unnecessary that the amorphous silicon oxide-based binder exists in all of the spaces between the $MgF_2$ minute particles. It is enough that the amorphous silicon oxide-based binder exists in a part of the spaces between the $MgF_2$ minute particles to maintain the thin film of the $MgF_2$ minute particles. It is unnecessary that the amorphous silicon oxide-based binder completely exists in the spaces between the $MgF_2$ minute particles and the base material. It is enough that the amorphous silicon oxide-based binder exists in a part of the spaces between the $MgF_2$ minute particles and the base material, and thus the amorphous silicon oxide-based binder reinforces the bonding between the $MgF_2$ minute particles and the base material.

In the $MgF_2$ optical thin film of the present invention, the $MgF_2$ minute particles may have an average particle diameter of 1 nm to 100 nm (not less than 1 nm and not more than 100 nm). In this case, owing to the high crystallization property of the $MgF_2$ minute particles, the adhesion or agglutination between the $MgF_2$ minute particles can be suppressed to secure the voids between the $MgF_2$ minute particles so that the $MgF_2$ optical thin film having a porous structure may be successfully obtained. When the porous structure is provided, it is possible to obtain the $MgF_2$ optical thin film having the lower refractive index. The porous structure may have a percentage of voids or porosity of not more than 50%, in view of the retention of the film strength.

In the $MgF_2$ optical thin film of the present invention, the amorphous silicon oxide-based binder may be formed of amorphous silica. In this case, the refractive index of amorphous silica is low, i.e., 1.42. Therefore, it is possible to secure the low refractive index of the entire thin film even when the composite is formed together with the $MgF_2$ minute particles.

The $MgF_2$ optical thin film of the present invention may have a strength of the thin film of not less than 30 MPa and especially not less than 110 MPa, as measured by a micro-indentation test method. In this case, no scratch is formed even when the film surface is manually wiped, because the film strength is not less than 30 MPa. The $MgF_2$ optical thin film is easily applied to a variety of ways of use.

The $MgF_2$ optical thin film of the present invention may have a refractive index of 1.10 to 1.42 at a design center wavelength $\lambda_c$. In this case, the refractive index of the $MgF_2$ optical thin film is within the predetermined range. Therefore, it is easy to form the antireflection film by using the $MgF_2$ optical thin film as a low refractive index material.

A multilayered optical thin film of the present invention comprises a plurality of stacked optical thin films, wherein the $MgF_2$ optical thin film of the present invention may be stacked as an outermost layer of the stacked optical thin films. The refractive index of the outermost layer can be suppressed to be sufficiently low, because the $MgF_2$ optical thin film of the present invention is stacked at the outermost layer in the multilayered optical thin film of the present invention. It is possible to obtain the antireflection film having the low reflectance in a wide wavelength band and a wide angle band.

A multilayered optical thin film of the present invention comprises a plurality of stacked optical thin films, wherein a plurality of $MgF_2$ optical thin films, each of the films being of the present invention, are included in the multilayered optical thin film. In this case, other layers can be stacked, because the mechanical strength of the $MgF_2$ optical thin film is high. The range of application of the $MgF_2$ optical thin film is wide. In the multilayered optical thin film of the present invention, a plurality of $MgF_2$ optical thin films may be disposed adjacently to each other, and a difference in refractive index between the adjacent $MgF_2$ optical thin films may be 0.02 to 0.23.

A multilayered optical thin film of the present invention comprises a plurality of stacked optical thin films, wherein the stacked optical thin film may include the $MgF_2$ optical thin film of the present invention and an optical thin film formed by a dry process.

An optical element of the present invention comprises a base material which has a refractive index of 1.4 to 2.1; and the $MgF_2$ optical thin film of the present invention which is stacked on at least one of optical surfaces of the base material; wherein at least one of the optical surfaces is formed to have one of a flat surface and a curved surface.

In the optical element of the present invention, at least one of the optical surfaces of the base material may be formed to have the curved surface form having such a shape that (effective lens diameter D)/(lens curvature radius R) is 0.5 to 2. In this case, according to the optical element of the present invention, the $MgF_2$ optical thin film can be formed by the wet process. Therefore, the $MgF_2$ optical thin film can be formed to have a uniform thickness entirely on the optical surface even when the thin film is formed on the curved surface having D/R within the predetermined range. Therefore, it is easy to obtain the excellent optical characteristic.

An optical element of the present invention comprises a substrate, and a multilayered antireflection film which is formed on the substrate and which is constructed of a stack of at least three types of layers having different refractive indexes respectively; wherein an uppermost layer, of the multilayered antireflection film, which makes contact with a medium, may be the $MgF_2$ optical thin film of the present invention, the $MgF_2$ optical thin film having a refractive index of not more than 1.30 at a design center wavelength $\lambda_0$; and remaining layers, of the multilayered antireflection film, other then the uppermost layer may be constructed by stacking a layer having a refractive index of not less than 2 at the design center wavelength $\lambda_0$ and a layer having a refractive index of 1.38 to 1.7 at the design center wavelength $\lambda_0$. In this case, the wavelength band characteristic or the incident angle characteristic is remarkably improved. The reflectance can be suppressed to be low with respect to the light beam allowed to come in a wide angle range, and the reflectance can be suppressed to be low over a wide wavelength region.

In the optical element of the present invention, a layer, among the layers, which makes contact with the substrate, may have a refractive index of 1.38 to 1.7 at the design center wavelength $\lambda_0$; and a second layer counted from the medium may have the refractive index of not less than 2 at the design center wavelength $\lambda_0$. When the refractive indexes are adjusted as described above, the reflectance can be further suppressed to be low over a wide wavelength region.

It is possible to obtain the optical element which makes it possible to suppress the reflectance to be low.

In the optical system of the present invention, $Rn \times Rm \leq 0.002\%$ may be satisfied (in the entire visible region) provided that Rn represents a reflectance of normal incidence on an n-th ghost-generating surface in the optical system, and Rm represents a reflectance of normal incidence on an m-th ghost-generating surface. When this relationship is satisfied, it is possible to obtain an image in which the ghost and the flare are more suppressed with the optical system.

In the optical system of the present invention, the multilayered antireflection film of the present invention may be applied to at least one of the n-th and m-th ghost-generating surfaces. In this case, it is possible to obtain an image in which the ghost and the flare are further suppressed with the optical system.

In the optical system of the present invention, the multilayered antireflection film may be applied to a surface to which a flat surface or a concave surface is opposite as viewed from a diaphragm of the optical system. In this case, it is possible to more effectively obtain an image in which the ghost and the flare are further suppressed with the optical system. In other words, if the reflection is caused on the surface to which the flat surface or the concave surface is opposite as viewed from the diaphragm of the optical system, the influence is greatly exerted on the image as compared with a case in which the reflection is caused on any other surface. Therefore, when the multilayered antireflection film is provided on the surface as described above to suppress the reflection, it is possible to obtain an image in which the ghost and the flare are further suppressed more effectively as compared with a case in which the multilayered antireflection film is provided on any other surface.

The optical element of the present invention may be used for a light beam having a wavelength region of 400 nm to 800 nm. The optical element of the present invention may be used for an imaging optical system or an observation optical system.

The optical system of the present invention is constructed of a plurality of optical elements arranged between an object and an image plane, wherein at least one of the plurality of optical elements is the optical element of the present invention.

According to a second aspect of the present invention, there is provided a method for producing an $MgF_2$ optical thin film, comprising a step of preparing a sol solution in which $MgF_2$ minute particles are dispersed; a step of preparing a binder solution which contains a component capable of forming an amorphous silicon oxide-based binder by a reaction; a step of preparing a coating liquid by mixing the sol solution and the binder solution; a step of forming a film by coating the coating liquid on a base material and by performing drying; and a step of performing a heat treatment after forming the film.

The optical thin film of the present invention as described above can be produced by the method for producing the $MgF_2$ optical thin film of the present invention. According to this production method, the sol solution and the binder solution are mixed with each other to prepare the coating liquid, and the coating liquid is coated on the base material, then by performing drying to form the film. Therefore, it is possible to coat the sol solution and the binder solution together on the base material. The labor, which is required for the coating and the drying to form the film, is decreased. It is thus easy to produce the $MgF_2$ optical thin film with which the effect is obtained as described above.

According to a third aspect of the present invention, there is provided a method for producing an $MgF_2$ optical thin film, comprising a step of preparing a sol solution in which $MgF_2$ minute particles are dispersed; a step of preparing a binder solution which contains a component capable of forming an amorphous silicon oxide-based binder by a reaction; a step of forming a porous film by coating the sol solution on a base material and by performing drying; a step of coating the binder solution on the porous film and impregnating the binder solution into the porous film; and a step of performing a heat treatment after the impregnation.

According to the method for producing the $MgF_2$ optical thin film of the present invention, the sol solution is coated on the base material, followed by performing drying to form the porous film. The porous film is coated and impregnated with the binder solution. Therefore, there is no labor to uniformly or homogeneously mix the sol solution and the binder solution. Further, the respective solutions are not mixed with each other. Therefore, the interaction is scarcely caused between the components of the respective solutions. Accordingly, it is easy to select the respective components and it is easy to produce the $MgF_2$ optical thin film with which the effect is obtained as described above. Therefore, it is appropriate to select the production method according to the second or third aspect of the present invention depending on the solution components.

In the method for producing the $MgF_2$ optical thin film of the present invention, the sol solution may be prepared by synthesizing the $MgF_2$ minute particles by reacting a magnesium compound and a fluorine compound in a solvent. Accordingly, it is possible to prepare the sol solution in which the $MgF_2$ minute particles are dispersed uniformly or homogeneously.

In the method for producing the $MgF_2$ optical thin film of the present invention, the sol solution may be prepared by mixing the magnesium compound and the fluorine compound in the solvent and performing at least one of a pressurizing treatment and a heat treatment. Accordingly, it is easy to prepare the sol solution in which the more crystalline $MgF_2$ minute particles are dispersed uniformly or homogeneously.

In the method for producing the $MgF_2$ optical thin film of the present invention, the magnesium compound may be magnesium acetate, the fluorine compound may be hydrofluoric acid, and the solvent may be methanol.

In the method for producing the $MgF_2$ optical thin film of the present invention, a molar ratio of fluorine contained in the fluorine compound existing in the solvent to magnesium contained in the magnesium compound existing in the solvent may be 1.9 to 2.0.

In the method for producing the $MgF_2$ optical thin film of the present invention, the component, which is capable of forming the amorphous silicon oxide-based binder, may be an organic silicon compound. When the organic silicon compound is used, $SiO_2$ can be formed by the reaction between the $MgF_2$ minute particles. Therefore, the connection can be made between the $MgF_2$ minute particles with a small amount of the binder.

In the method for producing the $MgF_2$ optical thin film of the present invention, the organic silicon compound may be silicon alkoxide, a polymer thereof, or polysilazane. When the compound as described above is used, the reaction can be performed at a lower temperature to effect the connection between the $MgF_2$ minute particles.

In the method for producing the $MgF_2$ optical thin film of the present invention, an $SiO_2$-converted concentration of silicon in the coating liquid or the binder solution to be coated on the porous film may be not more than 5% by weight. Accordingly, it is possible to make the connection between the $MgF_2$ minute particles with a smaller amount of $SiO_2$.

In the method for producing the $MgF_2$ optical thin film of the present invention, the coating liquid or the sol solution may be coated on the base material by a spin coat method or a dip coat method. When the method as described above is used, it is easy to form a more uniform $MgF_2$ optical thin film.

In the method for producing the $MgF_2$ optical thin film of the present invention, the coating liquid or the sol solution may be coated on the base material in an atmosphere of relative humidity of 5% to 40% by a spin coat method. The present inventors have found out the following fact. That is, when the coating is performed at the specified relative humidity as described above, then any unevenness such as any radial stripe is hardly caused during the coating, and it is possible to form a more uniform $MgF_2$ optical thin film.

In the method for producing the $MgF_2$ optical thin film of the present invention, the coating liquid or the sol solution may be coated on the base material by a spin coat method by rotating the base material at a maximum number of revolutions of not less than 500 rpm and not more than 9,000 rpm within 0 second to 3 seconds after supplying the coating liquid or the sol solution to the base material. When this procedure is adopted, then any unevenness such as any radial stripe is hardly caused during the coating, and it is easy to form the more uniform $MgF_2$ optical thin film.

In the method for producing the $MgF_2$ optical thin film of the present invention, the $MgF_2$ optical thin film having a desired refractive index may be produced by adjusting an $SiO_2$-converted concentration of silicon in the binder solution or the coating liquid which is to be coated on the porous film and with which the porous film is to be impregnated. In the method for producing the $MgF_2$ optical thin film of the present invention, wherein a plurality of pieces of the $MgF_2$ optical thin film having desired refractive index may be produced by adjusting a molar ratio of fluorine contained in the fluorine compound to magnesium contained in the magnesium compound of the sol solution. The refractive index of the $MgF_2$ optical thin film to be obtained can be adjusted by adjusting the concentration of silicon of the binder solution or the coating liquid and/or adjusting the F/Mg ratio of the sol solution. Therefore, it is easy to produce the $MgF_2$ optical thin film having the desired refractive index. The $MgF_2$ minute particles may have an average particle diameter of 1 nm to 100 nm.

A binder-containing $MgF_2$ sol solution of the present invention is a sol solution for producing the $MgF_2$ optical thin film by the production method of the present invention, wherein the sol solution contains $MgF_2$ minute particles having an average particle diameter of 1 nm to not more than 100 nm and one of silicon alkoxide and a polymer thereof. When the binder-containing $MgF_2$ sol solution is coated and dried to produce $SiO_2$, it is possible to obtain a $MgF_2$ optical thin film in which the $MgF_2$ minute particles are connected to one another by a small amount of $SiO_2$.

BEST MODE FOR CARRYING OUT THE INVENTION

First and second embodiments of the present invention will be successively explained below.

First Embodiment

Figure 1:
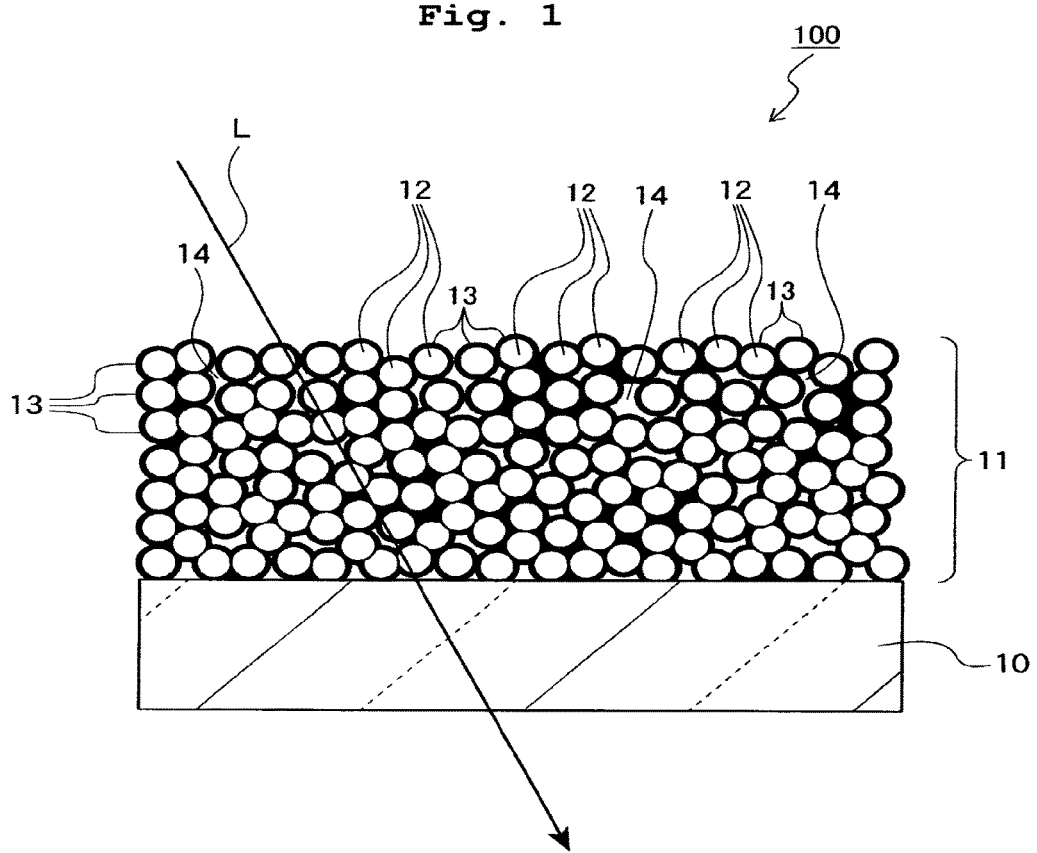
FIG. 1 shows a schematic magnified sectional view illustrating an optical element according to a first embodiment.

FIG. 1 shows an optical element in which an $MgF_2$ optical thin film ($MgF_2$—$SiO_2$ film) of the first embodiment is formed. The optical element 100 includes a base material 10 and the $MgF_2$ optical thin film 11 which is stacked on a flat optical surface of the base material 10. The base material 10 is formed of, for example, glass, plastic or the like having a refractive index of 1.4 to 2.1, and may be a plate member or a lens. The optical surface of the base material 10 may be formed to have a curved surface form.

The optical thin film 11 is an antireflection film which is stacked on at least one optical surface of the base material 10 onto which the light is radiated. In this embodiment, the optical thin film 11 is a singlelayered $MgF_2$ antireflection film.

The optical thin film 11 includes $MgF_2$ minute particles 12 and an amorphous silicon oxide-based binder 13. The connection is made by the amorphous silicon oxide-based binder 13 between a large number of the $MgF_2$ minute particles 12 and between the large number of the $MgF_2$ minute particles 12 and the base material 10. In FIG. 1, the binder 13 is depicted to surround the circumferences of the respective $MgF_2$ minute particles 12.

The $MgF_2$ minute particles 12 are minute particles composed of $MgF_2$ crystals. It is appropriate that the $MgF_2$ minute particles 12 are highly crystalline minute particles preferably having an average particle diameter of 1 nm to 100 nm, for the following reason. That is, the highly crystalline $MgF_2$ minute particles 12 easily form a large number of voids 14 between the large number of $MgF_2$ minute particles 12, and thus it is easy to suppress the change into any dense property which would be otherwise caused, for example, by the mutual adhesion or agglutination between the minute particles during the production.

The amorphous silicon oxide-based binder 13 is composed of an oxide such as amorphous silica which is capable of forming the network structure composed of $SiO_2$. The amorphous silicon oxide-based binder 13 exists in irregular shapes between the large number of $MgF_2$ minute particles 12 disposed mutually closely (in abutment) or between the base material 10 and the $MgF_2$ minute particles 12 disposed closely or in abutment with respect to the base material 10, to thereby make the integral connection or bonding therebetween.

The amorphous silicon oxide-based binder 13 as described above can be used at an arbitrary ratio with respect to the $MgF_2$ minute particles 12. However, it is preferable to use the $MgF_2$ minute particles 12 in a smaller amount within a range in which the strength of the film itself and the adhesive force with respect to the base material 10 are sufficiently obtained. It is appropriate that the amorphous silicon oxide-based binder 13 exists in an amount of 10% by weight to 30% by weight with respect to the $MgF_2$ minute particles 12, for the following reason. That is, when the amorphous silicon oxide-based binder 13 exists at the rate as described above, then the $MgF_2$ minute particles 12 can be connected to one another while suppressing the amount of use of the amorphous silicon oxide-based binder 13 which is somewhat inferior in the environment resistance, and both of the film strength and the environment resistance can be achieved.

In the case of the $MgF_2$ optical thin film 11, the amorphous silicon oxide-based binder 13, which is arranged on the film surface to be irradiated with the light L, is formed to have a thin thickness. The amorphous silicon oxide-based binder 13, which exists on the surfaces of the $MgF_2$ minute particles 12 arranged on the film surface, has the thickness which is not more than 5% of the wavelength of the light L to be radiated. It is preferable that the amorphous silicon oxide-based binder 13, which exists between the $MgF_2$ minute particles 12 and between the large number of $MgF_2$ minute particles 12 and the base material 10, has the thickness which is thinner than the particle diameter of the $MgF_2$ minute particles 12. The thickness of the amorphous silicon oxide-based binder 13 may be partially formed to be thicker than the particle diameter, for any reason in view of, for example, the production.

When the thickness of the amorphous silicon oxide-based binder 13 existing on the surfaces of the $MgF_2$ minute particles arranged on the film surface is thicker than 5% of the wavelength of the light L to be radiated, the film is regarded as an optically dense silica film. The uppermost layer is the silica film having a refractive index of 1.42. When the thickness is thinner than 5% of the wavelength of the light L to be radiated, the optical influence is negligible. Therefore, the $MgF_2$ optical thin film is provided, in which the uppermost layer has a low refractive index. The thickness of the amorphous silicon oxide-based binder 13 can be measured by the measurement of the transmittance and reflection spectral characteristics or by the (scanning type) electron microscopic observation of the cross section of the film.

The $MgF_2$ optical thin film 11, for which the thickness of the binder is adjusted as described above, can have a refractive index of 1.10 to 1.50. The film strength, which is measured by the microindentation method, can be made to be not less than 30 MPa and preferably not less than 110 MPa.

As for the $MgF_2$ optical thin film 11, the film strength may be also improved such that the large number of voids 14, which are formed between the large number of $MgF_2$ minute particles 12, are filled with the amorphous silicon oxide-based binder 13. However, the large number of voids 14 can be maintained without being filled with the amorphous silicon oxide-based binder 13. Accordingly, it is possible to reduce the refractive index of the $MgF_2$ optical thin film 11.

In this embodiment, the $MgF_2$ optical thin film 11 has a porous structure in which the large number of voids 14 are irregularly formed mutually among the base material 10, the large number of $MgF_2$ minute particles 12, and the amorphous silicon oxide-based binder 13 connecting them. In the porous structure, it is preferable that the percentage of voids or the porosity is not more than 50%, for the following reason. That is, if the porosity is high, then the refractive index is lowered with ease, but the mechanical strength of the film becomes too low, and the film is easily exfoliated, for example, by being manually wiped.

The $MgF_2$ optical thin film 11 as described above may be formed on the flat optical surface of the base material 10 as shown in FIG. 1. However, the $MgF_2$ optical thin film 11 may be formed on a curved optical surface. In this case, the $MgF_2$ optical thin film 11 can be also formed on a curved surface on which (effective lens diameter D)/(lens curvature radius R) is 0.5 to 2 and especially 0.5 to 1. D/R indicates the degree of the curved surface of the lens. D/R of 2 indicates a complete hemispherical lens. As the value is smaller, the curve of the lens becomes gentler.

When the radius of curvature of the base material 10 is small, and/or when the areal size is large, then the optical thin film cannot be formed to have any uniform thickness as a whole when the optical thin film is formed by the dry process such as the vacuum vapor deposition method, the sputtering method and the like. Usually, the thickness on a surface portion having an inclination with respect to a supply direction in which the raw material is supplied is thinner than the thickness of the film formed on a surface portion more perpendicular to the supply direction than the inclined surface portion. However, the $MgF_2$ optical thin film 11 of this embodiment is formed by the wet process as described above. Therefore, the uniform thickness can be provided on the entire optical surface.

According to the $MgF_2$ optical thin film having the structure as described above, the $MgF_2$ minute particles are used as the main constitutive substance of the film, and the connection is made between the $MgF_2$ minute particles by the amorphous silicon oxide-based binder. Therefore, the strong connection can be made between the $MgF_2$ minute particles and between the $MgF_2$ minute particles 12 and the base material 10. Accordingly, it is possible to improve the film strength and the adhesive force between the film and the base material. The $MgF_2$ minute particles, which are the main constitutive substance, are excellent in the environment resistance. Further, the amorphous silicon oxide-based binder 13, which is composed of $SiO_2$ that is somewhat inferior in the environment resistance, merely makes the connection between the $MgF_2$ minute particles 12 and between the $MgF_2$ minute particles 12 and the base material 10. Therefore, it is possible to decrease the amount of use of the amorphous silicon oxide-based binder 13, and it is easy to secure the environment resistance as the entire film. Further, the refractive index of the thin film can be reduced by using the $MgF_2$ minute particles having the refractive index of 1.38. The refractive index of $SiO_2$ is relatively low, i.e., 1.42. Therefore, even when the composite is formed together with $MgF_2$, the refractive index of the film is not raised so much.

Further, the amorphous silicon oxide-based binder 13, which exists on the surfaces of the $MgF_2$ minute particles 12 arranged on the surface of the $MgF_2$ optical thin film 11, has the thickness which is not more than 5% of the wavelength of the light L to be radiated. Therefore, any densified, thick layer composed of the amorphous silicon oxide-based binder 13 is not formed on the film surface of the $MgF_2$ optical thin film 11, and it is possible to suppress the refractive index of the $MgF_2$ optical thin film 11 to be low, which in turn makes it possible to obtain the excellent optical characteristics including, for example, the reflectance.

In particular, the $MgF_2$ optical thin film 11 as described above is formed on the outermost surface onto which the light L is radiated. Therefore, it is possible to obtain the sufficient antireflection performance by sufficiently lowering the refractive index of the $MgF_2$ optical thin film 11.

Figure 2:
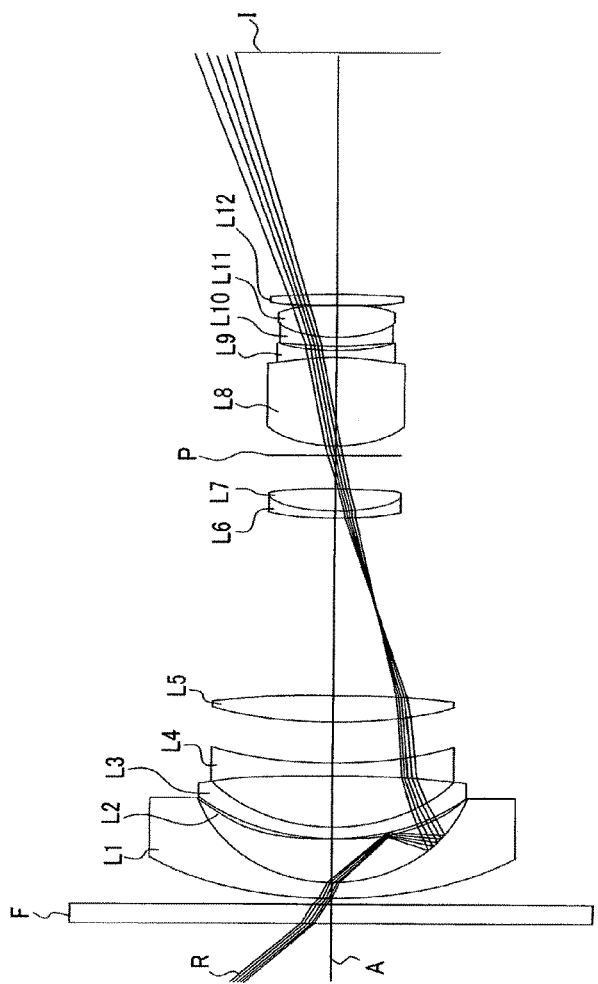
FIG. 2 shows an optical system according to the first embodiment.

Next, an explanation will be made with reference to FIG. 2 about an imaging optical system provided with the $MgF_2$ optical thin films as described above. The imaging optical system 118 includes a plurality of optical elements arranged between an object and an image plane, and is used as a zoom lens for a camera. The plurality of optical elements include, in an order from the side of the object, a plane-parallel F which is used as a protective glass, a negative meniscus lens L1 which has a convex surface directed toward the object, a cemented lens which is obtained by sticking a negative meniscus lens L2 having a convex surface directed toward the object and a negative meniscus lens L3 having a convex surface directed toward the object, a double-concave lens L4, a double-convex lens L5, a cemented lens which is obtained by sticking a negative meniscus lens L6 having a convex surface directed toward the object and a double-convex lens L7, an aperture diaphragm P, a cemented lens which is obtained by sticking a double-convex lens L8 and a double-concave lens L9, a cemented lens which is obtained by sticking a negative meniscus lens L10 having a convex surface directed toward the object and a double-convex lens L11, and a double-convex lens 12. The plurality of optical elements are arranged so that an image of the object is formed on the image plane I.

The $MgF_2$ optical thin films are formed on one or both surfaces of a part or all of the plurality of optical elements.

The ghost, which is generated on a surface of the plane-parallel F positioned most closely to the side of the object in the imaging optical system 118, the surface being on the side of the image, can be effectively avoided by forming the $MgF_2$ optical thin film 11 on this surface. The same or equivalent effect can be exhibited by the $MgF_2$ optical thin film 11, even when the imaging optical system 118 is used as an observation optical system in which an ocular lens is provided on the side of the image plane of the imaging optical system described above. It is possible to observe a sharp image in which the ghost and the flare are suppressed.

In the imaging optical system as described above, the $MgF_2$ optical thin film is provided on a surface of at least one of the optical elements. Therefore, it is possible to achieve the more excellent optical performance including, for example, the reflection characteristic with a smaller number of stacked layers.

This embodiment has been explained as illustrated by an example in which the singlelayered $MgF_2$ optical thin film is formed on the optical surface. However, it is also possible to form a multilayered optical thin film on the optical surface. In this case, it is possible to use the $MgF_2$ optical thin film for one layer among the multilayered optical thin film.

When the low refractive index film using the $MgF_2$ optical thin film as described above is used as the single layer so that the low refractive index film is used to form the multilayered film by making the combination with the film formed by the dry process such as the vacuum vapor deposition method, the sputtering method, the CVD method and the like, the $MgF_2$ optical thin film as described above, or the film obtained by a known wet process, it is possible to exhibit the more excellent optical performance.

For example, the multilayered optical thin film, in which the low refractive index $MgF_2$ optical thin film having the refractive index of not more than 1.30 is arranged at the uppermost layer, makes it possible to remarkably improve the wavelength band characteristic or the incident angle characteristic, and makes it possible to suppress the reflectance to be low with respect to the light allowed to come from a wide angle range, and it is possible to suppress the reflectance to be low over a wide wavelength region. In this case, as an underlying film, it is possible to appropriately select and use, for example, a film based on the dry process and a film based on the wet process having been hitherto used. When the $MgF_2$ optical thin film 11 formed by the wet process is used for the underlying film, it is easy to form all of the layers including the uppermost layer to have a uniform film thickness.

A multilayered optical thin film, which includes two layers of the adjacent $MgF_2$ optical thin films as described above, can be also formed on the optical surface onto which the light is to be radiated. In this case, the following film construction is appropriate. That is, a $MgF_2$ optical thin film 11, in which the refractive index is as low as possible, is arranged for the uppermost layer. However, another $MgF_2$ optical thin film 11, in which the refractive index is relatively high, is included for the underlying film.

Further, the $MgF_2$ optical thin films 11 can be stacked adjacently. In this case, it is preferable that the difference in the refractive index between the adjacent $MgF_2$ optical thin films is 0.02 to 0.23. It is appropriate that the refractive index of the $MgF_2$ optical thin film disposed on the inner side is higher than the refractive index of the $MgF_2$ optical thin film disposed on the outer side. Accordingly, it is possible to improve, for example, the wavelength band characteristic in the same manner as in a general antireflection film. Further, when the refractive index of the $MgF_2$ optical thin film disposed on the inner side is formed to be higher than the refractive index of the $MgF_2$ optical thin film disposed on the outer side, it is possible to strengthen the film strength of the optical thin film disposed on the inner side as compared with the film strength of the optical thin film disposed on the outer side. Therefore, it is easy to perform the stacking, and it is easy to perform the production.

Next, an explanation will be made about a method for producing the $MgF_2$ optical thin film as described above. The $MgF_2$ optical thin film 11 as described above is produced as follows. That is, a sol solution, in which the $MgF_2$ minute particles 12 having the average particle diameter of 1 nm to 100 nm are dispersed, is prepared, and a binder solution, which contains the component capable of forming the amorphous silicon oxide-based binder 13 by the reaction, is prepared. They are supplied to the optical surface of the base material 10 so that a large number of the $MgF_2$ minute particles 12 are deposited. Further, the connection is made with the amorphous silicon oxide-based binder 13 between the $MgF_2$ minute particles 12 and between the $MgF_2$ minute particles 12 and the base material 10.

The sol solution, in which the $MgF_2$ minute particles 12 are dispersed, can be prepared by mixing and reacting a magnesium compound and a fluorine compound in the solvent to synthesize the $MgF_2$ minute particles. Those usable as the magnesium compound include, for example, acetic acid salt, chloride, alkoxide, and the like, and it is suitable to use magnesium acetate. Those usable as the fluorine compound include, for example, aqueous solution of hydrogen fluoride (hydrofluoric acid), anhydrous hydrogen fluoride, trifluoroacetic acid, and the like. It is suitable to use hydrofluoric acid. Those usable as the solvent include organic solvent such as alcohol. It is suitable to use methanol.

When the solvent such as methanol, which has the high velocity of vaporization, is used, then the velocity of vaporization is quick during the film formation, and it is not easy to form the film having the uniform film thickness. Therefore, it is preferable to perform the substitution after the synthesis with any solvent having a lower vapor pressure such as higher alcohol including, for example, propanol, butanol and the like.

In this synthesis reaction, it is preferable to enhance the crystallization property of the $MgF_2$ minute particles produced in the solvent, for the following reason. That is, when the crystallization property is enhanced, it is possible to suppress the densification which would be otherwise caused by the mutual adhesion or agglutination of the minute particles, even when the $MgF_2$ minute particles are accumulated or deposited when the $MgF_2$ optical thin film is formed. Accordingly, the pores can be formed sufficiently to provide the porous property.

In order to enhance the crystallization property of the $MgF_2$ minute particles, it is preferable that the pressurizing treatment and/or the heat treatment is performed after mixing the magnesium compound and the fluorine compound. When the sol solution is subjected to, for example, a treatment at a high temperature and a high pressure, the crystallization and the grain growth of the $MgF_2$ minute particles are caused. It is possible to form the porous film having the higher porosity, i.e., the low refractive index film. As described later on, when the strength of the porous film is raised, the refractive index is raised as well. Therefore, it is preferable that the sol solution, with which the $MgF_2$ film having the sufficiently low refractive index can be obtained, is used as the base in order to obtain the film which has the low refractive index and the high strength.

When magnesium acetate is used as the magnesium compound, and methanol is used as the solvent, then acetic acid and methanol can be reacted with each other to produce methyl acetate by performing the high temperature high pressure treatment, which is especially preferred, for the following reason. That is, when a large amount of acetic acid is contained in the $MgF_2$ sol solution, the sol solution is geleted (gel is formed) when the sol solution is concentrated, which is difficult to be subjected to the coating. This makes it impossible to form any thick $MgF_2$ optical thin film in some cases.

The inventors have found out that the molar ratio of fluorine contained in the fluorine compound to magnesium contained in the magnesium compound as the raw material for preparing the $MgF_2$ sol solution (hereinafter referred to as "F/Mg ratio" in some cases) affects the refractive index of the $MgF_2$ optical thin film. In other words, even when the $MgF_2$ films are treated with the $SiO_2$ solutions having a same concentration, the final refractive index differs among the $MgF_2$ films formed with the $MgF_2$ sol solutions having different ratios of hydrofluoric acid/magnesium acetate.

Therefore, when the $MgF_2$ sol solution is prepared, it is preferable that the F/Mg ratio is within a predetermined range. It is preferable to adopt a range of 1.9 to 2.0. If the F/Mg ratio is too low, then the obtained film tends to be dense, and the refractive index tends to increase. On the other hand, if the F/Mg ratio exceeds 2.0, the sol solution is easily geleted during the preparation of the sol solution.

When the F/Mg ratio is appropriately adjusted within the range of 1.9 to 2.0, the refractive index of the obtained $MgF_2$ optical thin film can be adjusted to have the desired value.

When the F/Mg ratio is relatively high, i.e., 1.99 to 2.00, the refractive index is hardly increased, even when the concentration of the binder solution described later on is made to be relatively high. Therefore, it is preferable to manufacture the low refractive index film. On the other hand, when the F/Mg ratio is lowered to about 1.95, the refractive index is increased even when the binder solution having the relatively low concentration is used. Therefore, it is preferable to manufacture the high refractive index film, probably for the following reason. That is, it is considered that the surfaces of the $MgF_2$ particles synthesized with the low F/Mg ratio are unstable, and the voids 14, which exist between the minute particles, tend to be collapsed when the particles are accumulated to form the film. Therefore, it is considered that the refractive index is increased.

As described above, when the F/Mg ratio and the $SiO_2$ solution concentration are adjusted so that the refractive index is adjusted to have the desired value, the refractive index can be optimally adjusted as the antireflection film for a variety of base materials having different refractive indexes. Therefore, it is possible to manufacture the antireflection film having the excellent performance. It is preferable that the $MgF_2$ concentration of the $MgF_2$ sol solution is less than 3%, for the following reason. That is, the refractive index can be lowered as the concentration is higher, but the gelation is easily caused when the concentration is too high.

Subsequently, the binder solution is prepared, which contains the component capable of forming the amorphous silicon oxide-based binder by the reaction.

The component, which is capable of forming the amorphous silicon oxide-based binder by the reaction, is a substance to be used to improve the mechanical strength of the $MgF_2$ porous film and the adhesive force with respect to the base material. Substrates assumed include, for example, a raw material substance which finally serves as the network-forming oxide, and a precursor substance which is in the state before being converted into the network-forming oxide. The network-forming oxide includes, for example, the so-called glass-forming oxide, for which it is preferable to use a substance mainly composed of $SiO_2$. As for the binder solution, it is preferable to use a solution which produces $SiO_2$ by the heat treatment.

The representative substance of the organic silicon compound, which produces $SiO_2$ by the heat treatment, includes silicon alkoxide and perhydropolysilazane.

The alkoxysilane includes tetramethoxysilane, tetraethoxysilane, tetrapropoxysilane, tetrabutoxysilane, tetratrimethoxysilane, methyltriethoxysilane, methyltripropoxysilane, methyltributoxysilane, ethyltrimethoxysilane, ethyltriethoxysilane, ethyltripropoxysilane, ethyltributoxysilane, propyltrimethoxysilane, propyltriethoxysilane, propyltripropoxysilane, propyltributoxysilane, dimethyldimethoxysilane, dimethyldiethoxysilane, dimethyldipropoxysilane, dimethyldibutoxysilane, diethyldimethoxysilane, diethyldiethoxysilane, diethyldipropoxysilane, diethyldibutoxysilane, methylethyldimethoxysilane, and methylpropyldiethoxysilane.

When the alkoxysilane is used, it may be used as it is. However, when the hydrolysis and the condensation polymerization are previously performed with an acid catalyst, the heat treatment temperature required for the conversion into $SiO_2$ can be lowered, which is preferred.

The use of tetraethoxysilane as the alkoxysilane to form the network structure by performing the hydrolysis is described in "Science of Sol-Gel Method" written by Sumio Sakuhana and published by AGNE Shofusha (1989). According to this document, when a mixture solution of tetraethoxysilane, water, acid, and alcohol is agitated at a temperature from room temperature to 80° C., the reaction is caused in accordance with the following formula.

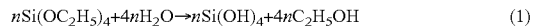
$$nSi(OC_2H_5)_4 + 4nH_2O \rightarrow nSi(OH)_4 + 4nC_2H_5OH \quad (1)$$

When the solution containing produced $Si(OH)_4$ is polymerized by performing the heat treatment, $SiO_2$ solid is obtained.

When polysilazane is used as the organic silicon compound, the reaction is caused with the water content in the air to form $SiO_2$ in accordance with the following reaction formula.

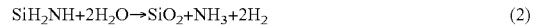
$$SiH_2NH + 2H_2O \rightarrow SiO_2 + NH_3 + 2H_2 \quad (2)$$

When a polysilazane solution, to which a small amount of the amine-based catalyst is added, is used, the reaction is advanced even at room temperature to successfully cause the conversion into $SiO_2$. Usually, the conversion is caused into $SiO_2$ by performing the heat treatment at a temperature of not less than 50° C. at a high humidity in which the relative humidity is not less than 50%. In this procedure, the sufficient film strength is obtained in a relatively short period of time, which is preferred.

The inventors have found out that, when the film is formed by using the binder solution as described above, the concentration of the binder solution is an important condition which affects the mechanical strength and the refractive index of the $MgF_2$ optical thin film. There is such a tendency that the strength of the film is increased but the refractive index is also increased when the concentration of the binder solution is increased. As the concentration is higher, the coefficient of contraction becomes higher as well, probably for the following reason. That is, it is considered that the strong force of contraction is allowed to act due to the change of the binder solution into $SiO_2$ as a result of the heat treatment.

If the concentration of the binder solution is too high, a film of the binder is consequently formed on the $MgF_2$ optical thin film. In this situation, the $SiO_2$ film, which is dense and which has the relatively high refractive index, is formed on the outermost surface, which is unfavorable to realize the wide band or the wide angle band of the optical thin film.

Therefore, the concentration of silicon contained in the binder solution is preferably not more than 5% by weight and especially favorably not more than 2% by weight as represented by the $SiO_2$-converted concentration. In the case of the single coating method described later on, the base material is coated with the coating liquid obtained by mixing the sol solution and the binder solution. However, even in this case, the concentration of silicon contained in the coating liquid is preferably not more than 5% by weight and especially favorably not more than 2% by weight as represented by the $SiO_2$-converted concentration.

The refractive index of the obtained $MgF_2$ optical thin film can be adjusted to have the desired value by adjusting the concentration of the binder solution. The refractive index of the obtained $MgF_2$ optical thin film is lowered as the concentration of the binder solution is lowered. When no binder solution is used at all, the refractive index of the $MgF_2$ optical thin film is lowered to 1.19. On the other hand, the refractive index is raised as the concentration of the binder solution is raised. The refractive index is raised to 1.42 when the $SiO_2$ film is formed with only the binder solution. Therefore, the obtained $MgF_2$ optical thin film can be set to have any arbitrary refractive index within a range of 1.19 to 1.42 by adjusting the concentration of the binder solution.

In the method of the present invention, the sol solution and the binder solution, which are prepared as described above, are supplied onto the base material 10 to perform the heat treatment. Accordingly, the large number of $MgF_2$ minute particles 12 are arranged on the surface of the base material 10. Further, the connection is made with the amorphous silicon oxide-based binder between the $MgF_2$ minute particles 12 and between the $MgF_2$ minute particles 12 and the base material 10.

In this procedure, the ratio of use between the $MgF_2$ sol solution and the binder solution can be appropriately selected, for example, because the refractive index and the film strength of the obtained $MgF_2$ optical thin film depend on the concentration. However, it is preferable that the ratio of use is to such an extent that the film strength, at which the manual wiping can be performed, is obtained, or that any thick $SiO_2$ film is not formed on the outermost surface.

The following two methods are conceivable to supply the sol solution and the binder solution to the surface which forms the optical surface of the base material 10.

The first method is a method (referred to as "double coating method") in which the porous $MgF_2$ film is formed on the base material 10, and then the binder solution is coated and permeated thereto. The second method is a method (referred to as "single coating method") in which the binder solution is previously mixed with the $MgF_2$ sol solution, and then the mixture is coated onto the base material 10.

Among the two methods, in the case of the double (twice) coating method, any one of alkoxysilane and polysilazane can be used for the sol solution. However, in the case of the single (once) coating method, alkoxysilane is preferred, for the following reason. That is, polysilazane cannot be mixed with any solvent which contains water even in any minute amount.

When polysilazane is used for the single coating method, it is necessary that the solvent of the $MgF_2$ sol solution is subjected to the solvent substitution with a non-aqueous solvent such as xylene and dibutyl ether other than alcohols, ketones, and esters, because the solvent of the $MgF_2$ sol solution is methanol.

In the case of the double coating method, the film is apparently dried immediately after the coating with the $MgF_2$ sol solution. However, the solvent still remains in the voids of the film, and hence the binder solution is not sufficiently permeated. Accordingly, it is preferable that by the double coating method, the binder solution is applied after sufficiently drying the $MgF_2$ film formed by applying the sol solution. The $MgF_2$ film can be dried by being heated or by being depressurized.

If the binder solution is coated without sufficiently drying the coating film after the $MgF_2$ sol solution has been coated, the binder film is consequently formed on the $MgF_2$ film in the same manner as in the case in which the binder solution having the high concentration is used. In such a situation, the binder film, which is dense and which has the relatively high refractive index, is consequently formed on the outermost surface, which is not preferred to realize the wide band or the wide angle band of the optical thin film. Therefore, in order to prevent the binder film from being formed on the $MgF_2$ film, it is preferable that the concentration of the binder solution is relatively low, and the $MgF_2$ film is sufficiently dried.

In the single coating method, even when the concentration of the binder solution is increased, the $SiO_2$ film is hardly produced on the $MgF_2$ film. In addition, there is no need to perform the drying after forming the $MgF_2$ film. Further, it is enough to perform the coating step once, which is efficient.

In the double coating method, although it is necessary to perform coating twice, namely one for the $MgF_2$ sol solution and the other for the $SiO_2$ solution, this method is effective when the $SiO_2$ solution cannot be mixed with the $MgF_2$ sol solution. In the case of the single coating method, it is enough to perform the coating step once, which decreases the cost. However, the single coating method is limited to the case in which the $SiO_2$ solution can be mixed with the $MgF_2$ sol solution.

In the coating methods as described above, when the base material is coated with the $MgF_2$ sol solution, the binder solution, or the coating liquid, the coating can be performed by the spin coat method or the dip coat method. When the coating is performed by the spin coat method, uneven film thickness and radial stripe may cause the problem. As for the uneven film thickness, the coating can be performed uniformly by substituting a part of methanol as the solvent of the $MgF_2$ sol solution with the higher alcohol such as propanol, butanol, and pentanol as described above. As for the radial stripe, the situation is also improved by this method. However, it has been found out that the radial stripe can be greatly reduced when the spin coat is performed in an environment in which the relative humidity is not more than 40% and preferably not more than 33%. The radial stripe is a stripe generated radially from the center of the substrate to the circumference, which is the phenomenon inherent in the spin coat. A wave is generated on the liquid film due to the friction between the air and the liquid film disposed on the substrate during the rotation, and the wave remains as it is to form the minute unevenness in the film thickness, which is the mechanism for generating the radial stripes. A known effective way to reduce the radial stripes is to perform the spin coat while simultaneously rotating a disk disposed opposite to the substrate, thereby reducing the friction with the air. However, it is difficult to drip the coating liquid because the opposing disk becomes an obstacle to the coating liquid, which is disadvantageous and thus not suitable for the mass production.

In the present invention, this problem can be solved by merely lowering the relative humidity. Therefore, it is unnecessary to change the steps of the spin coat, and the productivity is not lowered. It is considered that when the low humidity is provided, the surface of the liquid film is quickly dried, and hence the wave is scarcely caused to thereby suppress the generation of the radial stripe.

If the spin coat is performed in an environment in which the relative humidity is less than 5%, then it is necessary to provide an extremely expensive and special dehumidifying apparatus, and the cost is consequently increased. Therefore, it is preferable that the relative humidity is not less than 5%.

When the coating is performed by the spin coat method, it is preferable that the base material is rotated at a maximum number of revolutions of 500 rpm to 9,000 rpm within 0 second to 3 seconds after supplying the coating liquid or the sol solution to the base material. Accordingly, it is possible to suppress the unevenness of the film thickness and the generation of the radial stripe.

Subsequently, the heat treatment is performed after forming the film by coating the $MgF_2$ sol solution and the binder solution on the base material as described above. When the heat treatment is performed, then $SiO_2$ is produced from the binder solution allowed to exist between the $MgF_2$ minute particles and between the $MgF_2$ minute particles and the base material, and thus the mechanical strength of the film and the adhesive force with respect to the base material are greatly improved.

It is enough that the heat treatment temperature is a relatively low temperature of not less than about 50° C., when alkoxysilane is previously polymerized to provide a semi-processed product. When alkoxysilane is used as it is, a high temperature of not less than about 300° C. is required.

When the temperature of the heat treatment becomes high, the base material is harmfully affected thereby as well. Therefore, it is preferable that the heat treatment is performed at a lower temperature depending on the base material to be used. When the binder solution containing alkoxysilane is used, then the temperature is preferably 50° C. to 300° C., for example, in the case of a glass base material, and the temperature is preferably 30° C. to 150° C. in the case of a plastic base material.

On the other hand, some types of polysilazane are converted into $SiO_2$ at room temperature. However, in general, polysilazane is converted into $SiO_2$ by the heat treatment performed at a temperature of not less than 50° C. When the binder solution containing polysilazane is used, then the temperature is preferably 50° C. to 200° C., for example, in the case of the glass base material, and the temperature is preferably 30° C. to 100° C. in the case of the plastic base material.

When the binder solution containing polysilazane is used, the $SiO_2$ film is more densified as the humidity is more raised, which is preferred.

According to the production method as described above, it is possible to form the $MgF_2$ optical thin film ($MgF_2$—$SiO_2$ film) which can be wiped manually and which has the refractive index lowered to 1.23. Further, the film can be formed to have the uniform thickness even on the lens having the small radius of curvature on which the film has been difficult to be formed by the conventional dry process. As for the antireflection film, the satisfactory antireflection effect is exhibited from the ultraviolet region to the near infrared region. Further, it is possible to control the refractive index of the film. Therefore, when the optimum refractive index of the film, which is adapted to the refractive index of the substrate, is selected, it is possible to provide the excellent antireflection film even in the case of the single layer.

The heat treatment for the film can be performed even at the low temperature. Therefore, the antireflection film can be formed not only on the glass substrate but also on the cemented lens including the plastic substrate and the resin layer. Hence, the range of application of the antireflection film is extremely wide. The antireflection film can be also used for the precision optical instrument including, for example, the camera lens, the microscopic objective lens, the binocular lens, the projector projection lens, the glass or plastic spectacle lens; as well as for the display including, for example, the liquid crystal display device, the plasma display, the electroluminescence display, and the cathode ray tube display device; the window glass and the show window; and the like.

Examples of the first embodiment will be explained below.

Preparation of $MgF_2$ Sol Solution $MgF_2$ sol solutions were prepared as follows by using hydrogen fluoride (hydrofluoric acid) and magnesium acetate as row materials. A hydrofluoric acid methanol solution was prepared, in which 50% hydrofluoric acid was dissolved in methanol. A magnesium acetate methanol solution was prepared, in which magnesium acetate tetrahydrate was dissolved in methanol. A predetermined amount of the hydrofluoric acid methanol solution was added dropwise (by dripping) while agitating the magnesium acetate methanol solution to prepare an $MgF_2$ sol solution. In Examples described below, the mol ratio (F/Mg ratio) between hydrofluoric acid and magnesium acetate as the raw materials was changed within a range of 1.90 to 2.0 when the $MgF_2$ sol solutions were prepared. The concentration of $MgF_2$ contained in the $MgF_2$ sol solutions was changed within a range of 0.5 to 2% by weight by adjusting the concentrations of hydrofluoric acid and magnesium acetate.

The $MgF_2$ minute particles were immediately synthesized in the sol solution. However, even when the temperature was retained at room temperature as it was, the reaction was not completed. Therefore, the synthesis reaction to produce $MgF_2$ was completed by performing a treatment at a high temperature and a high pressure. Simultaneously, the crystallization and the grain growth were performed for the $MgF_2$ minute particles. The high temperature high pressure treatment was performed by placing the $MgF_2$ sol solution in an autoclave vessel made of Teflon (trade name), which was then tightly closed, and by heating the $MgF_2$ sol solution in the vessel to 140° C. together with the vessel. The $MgF_2$ minute particles of the sol solution have an average particle diameter of 1 nm to 100 nm (average particle diameter was 20 nm in Examples described below).

As a result of the high temperature high pressure treatment, acetic acid as a byproduct was reacted with methanol as the solvent to produce methyl acetate. A large amount of acetic acid is contained in the $MgF_2$ sol solution. If the sol solution is concentrated without performing the high temperature high pressure treatment, then the sol solution is geleted, which cannot be subjected to the coating. The sol solution was successfully concentrated to have a high concentration without causing the gelation by changing a greater part of acetic acid into methyl acetate by the high temperature high pressure treatment. As a result, a thick $MgF_2$ film of 1,000 angstroms to 5,000 angstroms, which was directed to the region ranging from the visible region to the near infrared region, was successfully manufactured.

Preparation of $MgF_2$ Sol Substitution Solution

The dispersion medium of the $MgF_2$ sol solution, subjected to the high temperature high pressure treatment, was mainly composed of methanol. Therefore, even when the sol solution was subjected to the coating as it was, the film was hardly formed uniformly, because the velocity at which methanol was vaporized was too quick. Therefore, the sol solution was concentrated by using a rotary evaporator, followed by being diluted with an organic solvent having a lower vapor pressure, including, for example, higher alcohol such as propanol and butanol. Accordingly, a part of the methanol dispersion medium was substituted with such an organic solvent to prepare an $MgF_2$ sol substitution solution.

The velocity of vaporization was suppressed in the $MgF_2$ sol substitution solution, and the coating was successfully performed to provide the uniform thickness. In particular, when an amount of the methanol dispersion medium, which was not less than the half of the total content thereof, was substituted, the coating was successfully performed uniformly with ease without any unevenness. Further, in the case of the $MgF_2$ sol substitution solution, the refractive index and the thickness of the obtained film were not changed at all even after the elapse of 6 hours after the substitution. The film was formed satisfactorily.

Preparation of Binder Solution

A variety of binder solutions were prepared as the amorphous silicon oxide-based binders. A binder solution containing silicon alkoxide was used, which was obtained by dissolving tetraethoxysilane (TEOS) in methanol, and adding hydrochloric acid as a catalyst, followed by being refluxed at 80° C. for 24 hours. Another binder solution containing silicon alkoxide was used, which was SUMICE-FINE G-200B (trade name, $SiO_2$-converted concentration: 1.63% by weight) produced by Sumitomo Osaka Cement Co., Ltd.

A binder solution containing polysilazane was used, which was perhydro-polysilazane xylene solution NP110 (trade name, concentration: 1% by weight) produced by Clariant Japan.

Preparation of Coating Liquid

When the single coating method is adopted, the binder solution is mixed with the $MgF_2$ sol solution to prepare the coating liquid as follows. A binder solution containing silicon alkoxide was added by 50% by weight at the maximum to a sol solution subjected to a high temperature high pressure treatment, and the mixture solution was concentrated by using a rotary evaporator, followed by being diluted with an organic solvent having a lower vapor pressure, including, for example, higher alcohol such as propanol and butanol. Accordingly, a part of the methanol dispersion medium was substituted with the organic solvent to prepare the coating liquid. The velocity of vaporization was suppressed for the coating liquid, and the coating was successfully performed to provide the uniform thickness. In particular, when an amount of the methanol dispersion medium, which was not less than the half of the total content thereof, was substituted, the coating was successfully performed uniformly with ease without any unevenness.

Evaluation of Refractive Index of Film

The reflection and transmission profiles of the substrate having the film formed on one surface were measured by using U-4000 produced by Hitachi and CARY5 produced by Varian respectively. The film thickness and the refractive index of the film at a wavelength of 550 nm were determined by calculation from obtained results.

Evaluation of Coefficient of Contraction

In the case of the single coating method, the coefficient of contraction of the film was determined by measuring the difference in the film thickness generated by the presence and absence of the binder solution. In the case of the double coating method, the coefficient of contraction of the film was determined by measuring the difference in the film thickness generated before and after the binder treatment.

Evaluation of Manual Wiping Resistance

CK wiper produced by Kanebo, which was a synthetic fiber wiping cloth, was used. The cloth was wetted with methanol, and the substrate having the film formed thereon was manually wiped with the cloth. It was observed whether or not any scratch appeared on the film by the manual wiping while illuminating the substrate from the back with a focusing lamp to evaluate the manual wiping resistance.

Method for Measuring Adhesive Force of Film

The adhesive force (film strength (MPa)) of the film with respect to the substrate was measured by using a thin film material evaluation system (MH-4000) produced by NEC-Sanei by the microindentation test method in accordance with JIS R3255. The measurement was performed such that the sample was inclined by 35°, and the indentation velocity of the ruby indenter was 1.4 nm/sec.

Examples 1 to 5

The hydrofluoric acid methanol solution was mixed with the magnesium acetate methanol solution so that the $MgF_2$ concentration was 1%, and that the hydrofluoric acid/magnesium acetate ratio was 1.95 to prepare an $MgF_2$ sol solution. Subsequently, the sol solution was subjected to the high temperature high pressure treatment at 140° C. for 24 hours. The average particle diameter of $MgF_2$ minute particles contained in the treated $MgF_2$ sol solution was measured by the electron microscopic observation, which was 20 nm. The sol solution was concentrated by using the rotary evaporator, followed by being diluted with 1-propanol to substitute 67% of the methanol solvent. The $MgF_2$ sol solution was allowed to have an $MgF_2$ concentration of 2.5%, with which a silica glass substrate having a thickness of 3 mm was spin-coated at 2,000 rpm to form a porous $MgF_2$ film.

The substrate was dried at 70° C. for 1 hour, and then the temperature was returned to room temperature. An undiluted solution of SUMICEFINE G-200B or solutions obtained by diluting the undiluted solution 1.5 times, 2 times, 2.5 times, and 3 times with 2-butanol were used as binder solutions. The dried substrate was spin-coated with each of the binder solutions at 2,000 rpm. The silicon concentration of the undiluted solution of SUMICEFINE G-200B is 1.63% by weight as converted into the concentration of $SiO_2$. The concentration of the 3-fold diluted solution is 0.54% by weight, the concentration of the 2.5-fold diluted solution is 0.65% by weight, the concentration of the 2-fold diluted solution is 0.82% by weight, and the concentration of the 1.5-fold diluted solution is 1.09% by weight. The $SiO_2$ solution was permeated into the porous $MgF_2$ film, followed by being heated at 160° C. for 1 hour. $SiO_2$ was formed in the gaps of the porous film to form an $MgF_2$—$SiO_2$ film as the $MgF_2$ optical thin film.

The refractive indexes (before and after the $SiO_2$ treatment), the coefficient of contraction, and the film strength of the obtained $MgF_2$—$SiO_2$ films were measured respectively. As a result, as shown in Table 1, the following fact was revealed. That is, there was such a tendency that as the concentration of the binder solution was higher, the refractive index of the $MgF_2$—$SiO_2$ film became higher, and the film strength became higher as well. When the treatment was performed with the binder solution, each of the films was contracted. However, there was such a tendency that as the concentration of the binder solution was higher, coefficient of contraction became higher. It is considered that when the binder solution permeated into the porous film is changed into $SiO_2$ by the heat treatment, then the strong force of contraction is allowed to act, and the entire film is contracted. According to the results as described above, the following fact has been revealed. That is, the minute structure of the film, i.e., the porosity can be controlled by the concentration of the $SiO_2$ solution, and the refractive index of the film can be controlled.

The manual wiping resistance was tested for the $MgF_2$—$SiO_2$ film obtained in each of Examples 1 to 5. As a result, no scratch appeared on each of the films by the manual wiping.

Examples 6 to 8

$MgF_2$—$SiO_2$ films were formed by the double coating method in the same manner as in Examples 1 to 5 except that $MgF_2$ sol solutions were prepared by mixing the hydrofluoric acid methanol solution with the magnesium acetate methanol solution so that the $MgF_2$ concentration was 1%, and the ratio of hydrofluoric acid/magnesium acetate was 1.98, 1.99, and 2.0. Characteristics of the obtained films were measured. Results are shown in Table 1.

When the results are compared with each other with respect to Example 1, the following fact is appreciated. That is, there is such a tendency that as the ratio of hydrofluoric acid/magnesium acetate is higher, the refractive index of the $MgF_2$—$SiO_2$ film becomes lower. In order to make the refractive index of the $MgF_2$—$SiO_2$ film as low as possible, it is appreciated that the ratio of hydrofluoric acid/magnesium acetate is preferably allowed to approach 2.0. However, if the ratio of hydrofluoric acid/magnesium acetate exceeds 2.0, then the gelation is caused at the stage of preparation of the sol solution, or the gelation is caused during the concentrating operation. Therefore, it has been revealed that the ratio of hydrofluoric acid/magnesium acetate is preferably not more than 2.0.

The refractive index of the porous $MgF_2$ film, which is obtained before being treated with the binder solution, is 1.23 in Example 1, and the refractive index is 1.20 in Example 7, the difference therebetween being 0.03. However, the refractive index of the film, which is obtained after being treated with the binder solution, is 1.34 in Example 1, and the refractive index is 1.26 in Example 7, the difference therebetween being increased to 0.08. That is, the following tendency was observed. Even when the treatment is performed with the binder solution having the same concentration, the film tends to be densified after the treatment with the binder solution when the ratio of hydrofluoric acid/magnesium acetate is lowered. However, the film is hardly densified, when the ratio of hydrofluoric acid/magnesium acetate is raised.

Figure 3:
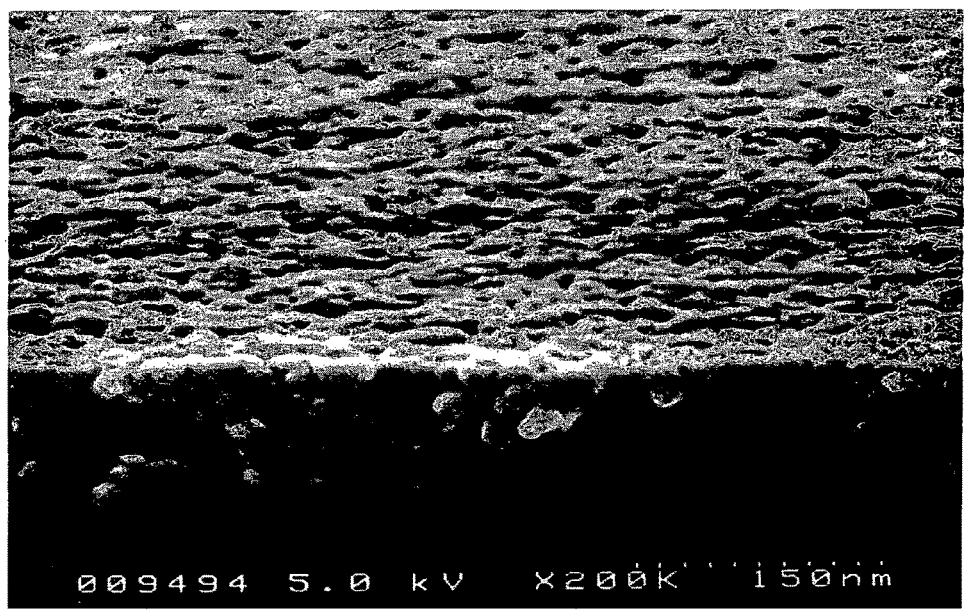
FIG. 3 shows an electron micrograph illustrating a surface and a cross section of an $MgF_2$—$SiO_2$ optical thin film obtained by Example 1.
Figure 4:
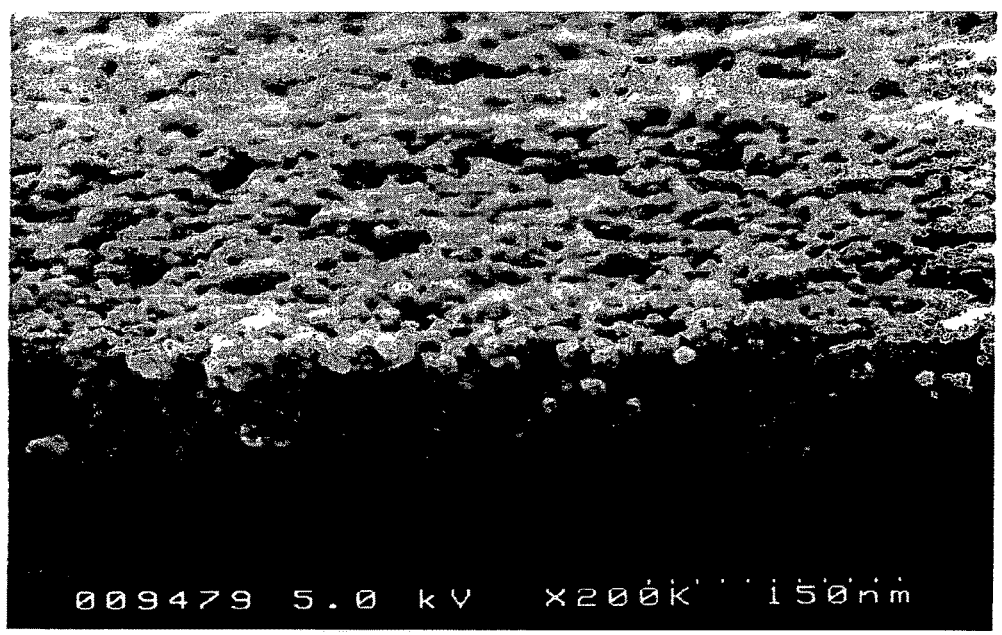
FIG. 4 shows an electron micrograph illustrating a surface and a cross section of an $MgF_2$—$SiO_2$ optical thin film obtained by Example 7.

FIGS. 3 and 4 show scanning type electron micrographs of cross sections of the $MgF_2$—$SiO_2$ films obtained in Examples 1 and 7 respectively. As shown in FIG. 3, in the case of the film of Example 1, it is appreciated that the film is relatively densified, because the edge of the film cross section is sharp. As shown in FIG. 4, in the case of the film of Example 7, the edge of the film cross section has a large number of concave/convex portions (porous property), which makes the edge to be indefinite.

Concave/convex portions, which were formed by the $MgF_2$ minute particles, were observed on the surfaces of the both films. Any $SiO_2$ film was not formed on both the $MgF_2$ films. The minimum wavelength of the light which may be radiated onto the $MgF_2$—$SiO_2$ film is 190 nm. Any $SiO_2$, which was not less than 5% of the wavelength (i.e., not less than 9.5 nm), did not exist on the surfaces of the $MgF_2$ minute particles arranged on the film surface (outermost portion). The specified thickness of $SiO_2$ disposed on the surfaces of the $MgF_2$ minute particles existing on the film surface was not more than 1 nm in average. Any $SiO_2$, which was not less than the particle diameter, did not exist between the $MgF_2$ minute particles. Accordingly, it has been revealed that a small amount of $SiO_2$ is formed only at the interior (inside) of the porous $MgF_2$ film to connect the $MgF_2$ minute particles. The film thickness of $SiO_2$ was measured by the electron microscope observation.

Further, the percentage of voids or the porosity was measured with a mercury porosimeter for the $MgF_2$—$SiO_2$ films. As a result, it was successfully confirmed that the porosity was 15 to 35% (not more than 50%).

Examples 9 and 10

$MgF_2$—$SiO_2$ films were formed by the double coating method in the same manner as in Examples 1 to 5 except that $MgF_2$ sol solutions were prepared under conditions in which the $MgF_2$ concentration was 0.5 and 2%, and the ratio of hydrofluoric acid/magnesium acetate was 1.99. Characteristics of the obtained films were measured. Results are shown in Table 1.

When the results are compared with each other with respect to Example 7, the following fact is appreciated. That is, there is such a tendency that as the $MgF_2$ concentration of the sol solution is higher, the refractive index of the film treated with the binder solution becomes lower. In order to make the refractive index of the $MgF_2$—$SiO_2$ film as low as possible, it is appreciated that it is appropriate to perform the preparation while making the $MgF_2$ concentration to be 2%. The $MgF_2$ sol solution having the concentration of 2% somewhat caused the gelation to some extent, and the viscosity was high. However, when the treatment was performed at a high temperature and a high pressure, then the gel disappeared, and the $MgF_2$ sol solution was changed into a sol solution having a low viscosity. When the concentration was 3%, the gel did not disappear even when the treatment was performed at a high temperature and a high pressure. Therefore, it is preferable that the concentration is less than 3%. Further, only a limited volume of the material can be dealt with in the high temperature high pressure treatment. Therefore, it is effective that the concentration of the sol solution is made as high as possible.

The refractive indexes of the films obtained in Examples 8 and 10 were lowered to 1.23. Further, no scratch was formed on the films even when the manual wiping was performed by using a synthetic fiber wiping cloth which was CK wiper produced by Kanebo.

According to the results of Examples 1 to 10, it has been successfully confirmed that the refractive index of the film after being treated with the binder solution is greatly affected by the condition including, for example, the ratio of hydrofluoric acid/magnesium acetate, the concentration of the binder solution, and the $MgF_2$ concentration.

Comparative Examples 1 to 3

$MgF_2$ sol solutions were prepared under conditions in which the $MgF_2$ concentration was 1%, and the ratio of hydrofluoric acid/magnesium acetate was 1.90, 1.95, and 2.0. Porous $MgF_2$ films were formed in the same manner as in Examples 1 to 5 by using the sol solutions, without performing the treatment with the binder solution. Characteristics of the obtained films were measured. Results are shown in Table 1.

As shown in Table 1, the film strength of the porous film not treated with the binder solution was extremely low. Even when the treatment was not performed with the binder solution, there was such a tendency that the refractive index was lowered as the ratio of hydrofluoric acid/magnesium acetate was more increased, when the comparison was made between Comparative Examples 1 and 2. The manual wiping resistance was tested for the $MgF_2$—$SiO_2$ films obtained in Comparative Examples 1 to 3. As a result, the film was wiped out by the manual wiping in the case of any one of the films.

Comparative Example 4

SUMICEFINE G-200B was concentrated with a rotary evaporator so that the concentration was 3.73%, followed by being used for spin-coating on a BSC7 glass substrate having a thickness of 10 mm at 2,000 rpm. Subsequently, the glass substrate was heat-treated at 160° C. to form an $SiO_2$ film on the glass substrate.

The refractive index of the $SiO_2$ film was 1.42. The $SiO_2$ film was dense, because the density was close to the theoretical density. The wavelength $\lambda_{RM}$, at which the reflectance was minimum, was about 550 nm. However, when the environment resistance test (durability test), in which the film was retained for 20 hours at 70° C. at a relative humidity of 80%, was performed, $\lambda_{RM}$ was subjected to the wavelength shift to about 650 nm. On the other hand, even when the environment resistance test was performed for the film obtained in Example 1 in the same manner as described above, then the reflectance was not changed, and only $\lambda_{RM}$ was subjected to the wavelength shift by about 5 nm.

As described above, the film composed of only $SiO_2$ had a low environment resistance, although the film was dense. Therefore, such a film was not suitable for the optical thin film for the precision optical instrument such as the camera and the microscope. On the other hand, in the case of the optical thin films, of Examples 1 to 7, which include $MgF_2$ as the basic substance thereof it is appreciated that the optical performance can be maintained over a long period of time, because these films have the high environment resistance. Table 1 also shows characteristics measured for the film obtained on Comparative Example 4.

TABLE 1

| Examples and Comparative Examples | Mol ratio of hydrofluoric acid/magnesium acetate | $MgF_2$ concentration of undiluted solution (wt. %) | Refractive index of $MgF_2$ film | Film thickness of $MgF_2$ film (nm) | Concentration of SUMICEFINE G-200B (wt. %, converted into $SiO_2$) |
|---|---|---|---|---|---|
| Ex. 1 | 1.95 | 1 | 1.23 | 890 | 0.54 |
| Ex. 2 | 1.95 | 1 | 1.23 | 890 | 0.65 |
| Ex. 3 | 1.95 | 1 | 1.23 | 890 | 0.82 |
| Ex. 4 | 1.95 | 1 | 1.23 | 890 | 1.09 |
| Ex. 5 | 1.95 | 1 | 1.23 | 890 | 1.63 |
| Ex. 6 | 1.98 | 1 | 1.21 | 970 | 0.54 |
| Ex. 7 | 1.99 | 1 | 1.20 | 1100 | 0.54 |
| Ex. 8 | 2.0 | 1 | 1.20 | 1270 | 0.54 |
| Ex. 9 | 1.99 | 0.5 | 1.25 | 1070 | 0.54 |
| Ex. 10 | 1.99 | 2 | 1.20 | 1090 | 0.54 |
| Comp. Ex. 1 | 1.90 | 1 | 1.25 | 830 | — |
| Comp. Ex. 2 | 1.95 | 1 | 1.23 | 890 | — |
| Comp. Ex. 3 | 2.0 | 1 | 1.20 | 1270 | — |
| Comp. Ex. 4 | — | — | — | — | 3.73 |

TABLE 1-continued

| Examples and Comparative Examples | Refractive index after SiO$_2$ treatment | Film thickness (angstrom) | Coefficient of contraction (%) | Film strength (MPa) | Manual wiping resistance |
|---|---|---|---|---|---|
| Ex. 1 | 1.34 | 800 | 10 | 175 | no scratch |
| Ex. 2 | 1.36 | 820 | 8 | 188 | no scratch |
| Ex. 3 | 1.38 | 770 | 13 | 205 | no scratch |
| Ex. 4 | 1.39 | 760 | 15 | 220 | no scratch |
| Ex. 5 | 1.41 | 600 | 33 | 237 | no scratch |
| Ex. 6 | 1.29 | 930 | 4 | 141 | no scratch |
| Ex. 7 | 1.26 | 1050 | 5 | 133 | no scratch |
| Ex. 8 | 1.23 | 1220 | 4 | 125 | no scratch |
| Ex. 9 | 1.28 | 1020 | 5 | 145 | no scratch |
| Ex. 10 | 1.23 | 1050 | 4 | 130 | no scratch |
| Comp. Ex. 1 | — | — | — | 18 | film wiped out |
| Comp. Ex. 2 | — | — | — | 22 | film wiped out |
| Comp. Ex. 3 | — | — | — | 19 | film wiped out |
| Comp. Ex. 4 | 1.42 | — | — | 233 | no scratch |

Examples 11 to 18

In Examples 11 to 18, MgF$_2$—SiO$_2$ films are formed by the single coating method. The hydrofluoric acid methanol solution was mixed with the magnesium acetate methanol solution to prepare MgF$_2$ sol solutions so that the MgF$_2$ concentration was 1%, and the ratio of hydrofluoric acid/magnesium acetate was 1.99 and 1.95. Subsequently, each of the sol solutions was subjected to a high temperature high pressure treatment at 140° C. for 24 hours. The average particle diameter of MgF$_2$ minute particles contained in each of the treated MgF$_2$ sol solutions was measured by the electron microscope observation, and the average particle diameter was 20 nm.

When SUMICEFINE G-200B as the binder solution was added by 10 to 50% by weight to each of the sol solutions, the solutions were successfully mixed uniformly. After that, each of the mixture solutions was concentrated by using a rotary evaporator, which was thereafter diluted with 1-propanol to substitute the methanol solvent to prepare the MgF$_2$ coating liquid containing the binder having the silicon concentration of 2.5 as converted into SiO$_2$.

The coating liquid was spin-coated on a silica glass substrate at 2,000 rpm in the same manner as in Examples 1 to 5, and then the heat treatment was performed at 160° C. Thus, the MgF$_2$—SiO$_2$ film was formed. Characteristics of the obtained films were measured. Results are shown in Table 2.

According to the results of Examples 11 to 14 and Examples 15 to 18, there was such a tendency that the refractive index was raised in proportion to the amount of addition of SUMICEFINE G-200B in the both cases in which the ratio of hydrofluoric acid/magnesium acetate were 1.99 and 1.95 respectively. However, even when the amount of addition was identical, the refractive index, which was obtained in a case that the ratio of hydrofluoric acid/magnesium acetate was 1.99, was lower than the refractive index which was obtained in a case that the ratio was 1.95. When the refractive index was not less than 1.23, then no scratch was formed by the manual wiping, and the wiping resistance was satisfactory.

The single coating method can be used provided that the binder solution can be mixed with the MgF$_2$ sol solution as in Examples 11 to 18. In this case, it is enough that the spin coat is performed only once. Therefore, the film can be formed efficiently as compared with the double coating method. Further, SUMICEFINE G-200B is cured when the heating is performed to at least a temperature of not less than about 50° C. Therefore, it is possible to improve the strength of the MgF$_2$ film, and it is possible to perform the manual wiping. When the films obtained in Examples 12 to 18 were heat-treated for 10 hours in the atmospheric air at 50° C., no scratch was formed even when the film was wiped with CK wiper in the same manner as in the treatment at 160° C. In the case of the lens in which the base material of the lens includes any resin or any resin layer, it is necessary that the heat treatment is performed at a temperature of not more than about 80° C. in order to avoid the deformation of the resin. However, the low refractive index optical thin film, which had the film strength capable of performing the manual wiping, was successfully formed even on the lens as described above.

TABLE 2

| Examples | Mol ratio of hydrofluoric acid/magnesium acetate of undiluted solution | Amount of addition of SUMICEFINE G-200B (wt. %, ratio against base) | Concentration of SUMICEFINE in coating liquid (wt. %, converted into SiO$_2$) | Refractive index after SiO$_2$ treatment | Film strength (MPa) | Wiping resistance |
|---|---|---|---|---|---|---|
| 11 | 1.99 | 10 | 0.41 | 1.20 | 110 | slightly scratched |
| 12 | 1.99 | 20 | 0.75 | 1.23 | 122 | no scratch |
| 13 | 1.99 | 30 | 1.03 | 1.26 | 131 | no scratch |
| 14 | 1.99 | 50 | 1.49 | 1.33 | 170 | no scratch |
| 15 | 1.95 | 10 | 0.41 | 1.35 | 180 | no scratch |
| 16 | 1.95 | 20 | 0.75 | 1.36 | 182 | no scratch |

TABLE 2-continued

| Examples | Mol ratio of hydrofluoric acid/magnesium acetate of undiluted solution | Amount of addition of SUMICEFINE G-200B (wt. %, ratio against base) | Concentration of SUMICEFINE in coating liquid (wt. %, converted into $SiO_2$) | Refractive index after $SiO_2$ treatment | Film strength (MPa) | Wiping resistance |
|---|---|---|---|---|---|---|
| 17 | 1.95 | 30 | 1.03 | 1.38 | 195 | no scratch |
| 18 | 1.95 | 50 | 1.49 | 1.40 | 213 | no scratch |

Examples 19 to 29

Sol solutions were prepared under a condition in which the $MgF_2$ concentration was 1%, and the high temperature high pressure treatment was performed at 140° C. for 24 hours. Each of the sol solutions was concentrated by using a rotary evaporator, followed by being diluted with 1-propanol to substitute 67% of the methanol solvent. The $MgF_2$ concentration of each of the sol solutions was 2.5%, and the sol solution was spin-coated on a silica glass substrate having a thickness of 3 mm at 2,000 rpm to form a porous $MgF_2$ film.

The substrate was dried at 70° C. for 1 hour, and then the temperature was returned to room temperature. The dried substrate was spin-coated with a polysilazane xylene solution as the binder solution (perhydro-polysilazane xylene solution NP110, concentration: 1% by weight) at 2,000 rpm, and then the heat treatment was performed.

In Examples 19 to 25, the ratio of hydrofluoric acid/magnesium acetate was 1.99. The polysilazane xylene solution of 1% was used. Additionally, solutions of 0.25, 0.33, and 0.5%, which were obtained by diluting the polysilazane xylene solution with xylene, were also used.

The heat treatment was performed under a condition at 150° C. in the atmospheric air in Examples 19 to 22, a condition at 70° C. at a humidity of 80% in Examples 23 and 24, and a condition at 50° C. at a humidity of 80% in Example 25.

The tendency, in which the refractive index of the film was raised as the polysilazane concentration was raised, was the same as that observed for the cases of Examples 1 to 5 in which SUMICEFINE was used for the $SiO_2$ solution. In Examples 19 and 20, any scratch was formed when the films were wiped with CK wiper, because of the low film strength. However, no scratch was formed when the refractive index was not less than 1.23. In Examples 23 to 25, the refractive index was rather raised, and the film was more densified in spite of the heat treatment performed at the low temperature of 50 to 70° C. (humidity: 80%), as compared with the case in which the heat treatment was performed at 150° C. in the atmospheric air. That is, when polysilazane is used as the binder solution, the humidity, which is provided during the heat treatment, is increased as compared with the atmospheric air. Accordingly, $SiO_2$ is formed at the low temperature of 50 to 70° C., the porous $MgF_2$ film is strengthened or reinforced, and the manual wiping can be performed. In Examples 26 to 29, the ratio of hydrofluoric acid/magnesium acetate was 1.95, and the heat treatment was performed at the humidity of 80% at 150° C. and 70° C. in the atmospheric air. When the polysilazane concentration was identical, the identical refractive index was obtained under any one of the heat treatment conditions. When the ratio of hydrofluoric acid/magnesium acetate is 1.95, the $MgF_2$ is easily densified. Therefore, the refractive index was not affected even when the heat treatment condition was changed.

In the case of any lens in which the base material includes any resin or any resin layer, if the heat treatment is performed at a high temperature of not less than 100° C., the resin is consequently deformed. Therefore, it is necessary that the heat treatment is performed at a temperature of not more than about 80° C. In this method, it is enough that the heat treatment is performed at a temperature of 50 to 70° C. Therefore, the film can be formed without deforming the lens as described above.

Subsequently, a resin layer, which was composed of an ultraviolet-curable resin having a refractive index of 1.55 and mainly composed of urethane acrylate and methacrylate, was formed to have a thickness of 0.5 mm on the glass substrate by effecting the radiation with a high pressure mercury lamp. Further, the $MgF_2$—$SiO_2$ film having a refractive index of 1.26, which was obtained in Example 23 or 25, was formed on the surface of the resin layer. The resin layer is used for an aspherical lens made of resin.

Figure 5:
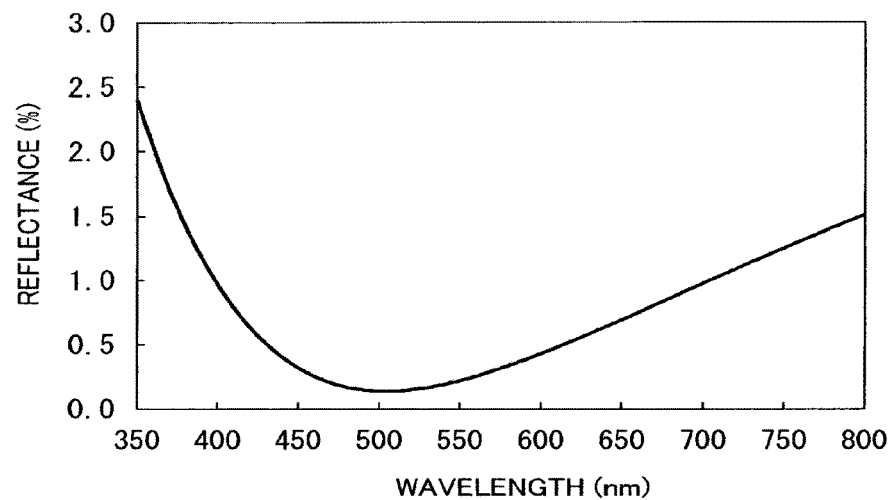
FIG. 5 shows a graph illustrating a spectral reflection characteristic of an optical element including an $MgF_2$—$SiO_2$ optical thin film provided on a resin layer manufactured in Example 29.

FIG. 5 shows a result of the measurement of the spectral reflectance of $MgF_2$—$SiO_2$ formed on the resin layer in the same manner as in Example 23. The spectral reflectance was measured by using a spectral reflectance measuring instrument U-4000 produced by Hitachi.

The reflectance was successfully lowered to 0.15% at a wavelength of 500 nm. The film was strongly adhered to the resin layer as well. No scratch was formed on the film even when the wiping was performed with CK wiper in the same manner as in the case in which the substrate was made of glass. The $SiO_2$ binder exhibited the effect to improve the adhesive force of the film with respect to the rein substrate as well. The heat treatment was low, i.e., 50 to 70° C. Therefore, the rein layer was not exfoliated from the substrate, and the rein layer was not deformed and clouded.

TABLE 3

| Examples | Mol ratio of hydrofluoric acid/magnesium acetate | Heat treatment condition | | Concentration of polysilazane (wt. %) | Refractive index after $SiO_2$ treatment | Film strength (MPa) | Wiping resistance |
| | | tempperature | humidity | | | | |
|---|---|---|---|---|---|---|---|
| 19 | 1.99 | 150° C. | atmospheric air | 0.25 | 1.21 | 115 | slightly scratched |
| 20 | 1.99 | 150° C. | atmospheric air | 0.33 | 1.21 | 117 | slightly scratched |

TABLE 3-continued

| Examples | Mol ratio of hydrofluoric acid/magnesium acetate | Heat treatment condition — tempperature | Heat treatment condition — humidity | Concentration of polysilazane (wt. %) | Refractive index after SiO$_2$ treatment | Film strength (MPa) | Wiping resistance |
|---|---|---|---|---|---|---|---|
| 21 | 1.99 | 150° C. | atmospheric air | 0.5 | 1.23 | 127 | no scratch |
| 22 | 1.99 | 150° C. | atmospheric air | 1 | 1.30 | 138 | no scratch |
| 23 | 1.99 | 70° C. | 80% | 0.5 | 1.26 | 145 | no scratch |
| 24 | 1.99 | 70° C. | 80% | 1 | 1.33 | 176 | no scratch |
| 25 | 1.99 | 50° C. | 80% | 0.5 | 1.26 | 138 | no scratch |
| 26 | 1.95 | 150° C. | atmospheric air | 0.5 | 1.30 | 146 | no scratch |
| 27 | 1.95 | 150° C. | atmospheric air | 1 | 1.36 | 184 | no scratch |
| 28 | 1.95 | 70° C. | 80% | 0.5 | 1.30 | 151 | no scratch |
| 29 | 1.95 | 70° C. | 80% | 1 | 1.36 | 198 | no scratch |

Example 30

The hydrofluoric acid methanol solution was mixed with the magnesium acetate methanol solution to prepare an MgF$_2$ sol solution so that the MgF$_2$ concentration was 2%, and that the ratio of hydrofluoric acid/magnesium acetate was 1.99. Subsequently, the sol solution was subjected to a high temperature high pressure treatment at 140° C. for 24 hours. The sol solution was concentrated by using a rotary evaporator, followed by being diluted with 1-propanol to substitute 67% of the methanol solvent. The MgF$_2$ concentration of the sol solution was 4%, and the sol solution was spin-coated on a silica glass substrate having a thickness of 3 mm at 1,000 rpm in an environment in which the room temperature was 24° C. and the relative humidity was 33% to form an MgF$_2$ film. As a result, the film was successfully formed uniformly without any unevenness. The refractive index was 1.19, and the thickness was 2,210 angstroms.

When the spin coat was performed under the same condition in an environment in which the relative humidity was 42%, stripes were formed radially from the center to the circumference of the substrate.

The substrate was dried at 70° C., and the temperature was returned to room temperature. The substrate was spin-coated at 2,000 rpm with the binder solution in which SUMICE-FINE G-200B was diluted three times with 2-butanol. The MgF$_2$—SiO$_2$ film, which was heat-treated at 150° C., had a refractive index of 1.20 and a thickness of 2,200 angstroms. When the evaluation was made for the wiping resistance with CK wiper, no scratch was formed on the film.

Even when the MgF$_2$ film, on which the radial stripes were formed, was subjected to the SiO$_2$ treatment, the radial stripes did not disappear.

When a coating liquid, which was obtained by adding SUMICEFINE G-200B as the binder solution to the sol solution, was used, no radial stripe was formed at a relative humidity of 33% as well in the same manner as described above. However, radial stripes were formed at a relative humidity of 42%.

Example 31

The hydrofluoric acid methanol solution was mixed with the magnesium acetate methanol solution to prepare an MgF$_2$ sol solution so that the MgF$_2$ concentration was 1%, and the ratio of hydrofluoric acid/magnesium acetate was 1.95. Subsequently, the sol solution was subjected to a high temperature high pressure treatment at 140° C. for 24 hours. The sol solution was concentrated by using a rotary evaporator, followed by being diluted with 1-propanol to substitute 67% of the methanol solvent. The MgF$_2$ concentration of the binder solution was 3.5%, and the binder solution was spin-coated on a silica glass substrate having a thickness of 3 mm in an environment in which the room temperature was 24° C. and the relative humidity was 33% to form an MgF$_2$ film.

The maximum number of revolutions was 2,000 rpm. When the number of revolutions arrived at 2,000 in 5 seconds, radial stripes were formed. However, when the number of revolutions arrived at 2,000 in 1 second, no radial stripe was formed.

Even when the relative humidity is lowered, it is not necessarily possible to completely prevent all of the radiation stripes, depending on the ratio of hydrofluoric acid/magnesium acetate. However, in such situations, the radiation stripe was allowed to successfully disappear by making the number of second or seconds, which was required until arrival at the maximum number of revolutions of the spin coat, to be within a relatively short period of time.

Example 32

Each of the MgF$_2$—SiO$_2$ films as obtained in Examples 1, 15, and 24 having a refractive index of 1.33 to 1.35 respectively was formed on an optical glass substrate having a refractive index nd=1.80 in place of the silica glass substrate. When the spectral reflectance of the obtained substrate was measured, the minimum value of the reflectance was 0.1%.

The MgF$_2$—SiO$_2$ film of Example 1 was formed on a concave lens having a refractive index nd=1.80 and a radius of curvature of 20 mm (D/R=1.83). The lens is one of lenses for constructing a lens system of a single lens reflex camera. When the film was formed, 67% of the methanol solvent was substituted with 1-propanol to prepare a sol solution to perform the spin coat by rotating the lens so that the number of revolutions arrived at 2,000 rpm in 1 second. The film thickness was controlled by changing the concentration of the sol solution so that the reflectance of the lens on which the MgF$_2$—SiO$_2$ film was formed was minimized at a wavelength of 600 nm.

It has been revealed that the film can be formed to have the uniform thickness on the surface having the small radius of curvature even in the case of the spin coat, unlike the general vacuum vapor deposition method.

The obtained concave lens was set to the lens system of the single lens reflex camera. When this camera was used to take a photograph, the ghost, which would be generated when a strong point light source such as the sun light was positioned at the corner of the image plane, had the color changed from the orange to the blue. The ghost was successfully made inconspicuous. The following fact has been revealed. That is, the $MgF_2$—$SiO_2$ film can be formed uniformly according to the method of the present invention on the surface of the lens group constructing the lens of the single lens reflex camera, although it is difficult to form any film uniformly on the surface by the vacuum vapor deposition method. Further, when this camera is used to take a photograph, it is possible to greatly reduce the ghost.

Example 33

Each of the $MgF_2$—$SiO_2$ films as obtained in Examples 4, 5, and 18 having a refractive index of 1.39 to 1.41, respectively, was formed on an optical glass substrate having a refractive index nd=2.02 in place of the silica glass substrate. When the spectral reflectance of the obtained substrate was measured, the minimum value of the reflectance was 0.1%.

The $MgF_2$—$SiO_2$ film of Example 4 was formed on a convex surface having a refractive index nd=2.02 and a radius of curvature of 3.5 mm (D/R=1.90). The lens is one of lenses constructing an objective lens system of a microscope. When the film was formed, 67% of the methanol solvent was substituted with 2-propanol to prepare a sol solution, followed by being subjected to the spin coat by rotating the lens so that the number of revolutions arrived at 7,000 rpm in 1 second. The film thickness was controlled by changing the concentration of the sol solution so that the reflectance of the lens on which the $MgF_2$—$SiO_2$ film was formed was minimized at a wavelength of 550 nm. It has been revealed that the film can be formed to have the approximately uniform thickness even in the case of the convex lens which is close to the hemisphere.

The obtained convex lens was incorporated into a part of the objective lens of the microscope. When the microscope was used to perform the fluorescent observation by using a laser as an exciting light source, the formation of interference fringes, caused by the laser beam in the observation field, was successfully suppressed to the minimum. The following fact has been revealed. That is, the $MgF_2$—$SiO_2$ film can be formed uniformly according to the method of the present invention on the surface of the lens included in the lens group constructing the objective lens of the microscope, although it is difficult to form any film uniformly on the surface by the vacuum vapor deposition method. Further, when the microscope having the lens is used to perform the observation, then it is possible to greatly reduce the ghost, and it is possible to obtain a high contrast image.

Example 34

A five-layered antireflection film, in which the $MgF_2$—$SiO_2$ film having an refractive index of 1.23 as obtained in each of Examples 8, 10, 12, and 21 was arranged at the uppermost layer, was formed on DF13 optical glass (nd=1.74). That is, $Al_2O_3$, $MgF_2$, and $ZrO_2$ films formed by the dry process and the $MgF_2$—$SiO_2$ film formed by the wet process were stacked on the DF13 optical glass.

The film construction, the film formation method, and the film thickness are as shown below in Table 4.

TABLE 4

| | Constitutive substance | Film formation method | Film thickness (nm) |
| --- | --- | --- | --- |
| Fifth layer | $MgF_2$ | wet process | 121.3 |
| Fourth layer | $ZrO_2$ | vapor deposition method | 11.1 |
| Third layer | $Al_2O_3$ | vapor deposition method | 10 |
| Second layer | $MgF_2$ | vapor deposition method | 28.8 |
| First layer | $Al_2O_3$ | vapor deposition method | 10 |
| Substrate | DF13 optical glass | | |

Figure 6:
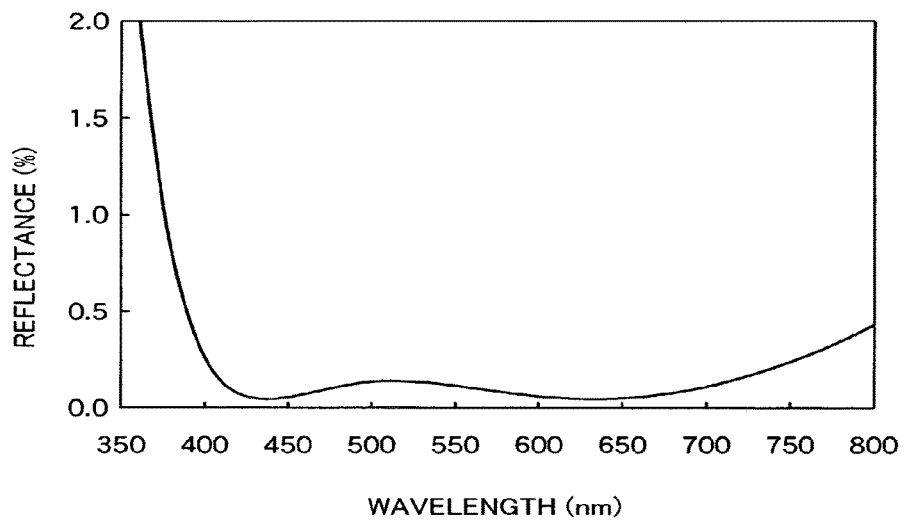
FIG. 6 shows a graph illustrating a spectral reflection characteristic of a multilayered optical thin film of Example 34.

FIG. 6 shows a result of the measurement of the reflectance of the substrate having the antireflection film formed thereon as described above. The reflectance is not more than 0.5% in the entire visible region at wavelengths from 400 nm to 800 nm. It is appreciated that the band is wide and the reflection is low. According to this result, the antireflection film, which has not been conventionally provided, has been successfully manufactured in accordance with the present invention.

Example 35

A two-layered antireflection film, in which the $MgF_2$—$SiO_2$ film having an refractive index of 1.38 as obtained in each of Examples 3 and 17 was arranged as the first layer and the $MgF_2$—$SiO_2$ film having an refractive index of 1.23 as obtained in each of Examples 8, 10, 12, and 21 was arranged as the second layer, was formed on BSC7 optical glass (nd=1.52). The multilayered antireflection film was successfully formed uniformly even on the lens having a small radius of curvature, because both of the two layers were formed by the wet film formation method.

The film construction, the film formation method, and the film thickness are as shown below in Table 5.

TABLE 5

| | Constitutive substance | Film formation method | Film thickness (nm) |
| --- | --- | --- | --- |
| Second layer | $MgF_2$—$SiO_2$ film | wet process | 104.6 |
| First layer | $MgF_2$—$SiO_2$ film | wet process | 93.3 |
| Substrate | BSC7 optical glass | | |

Figure 7:
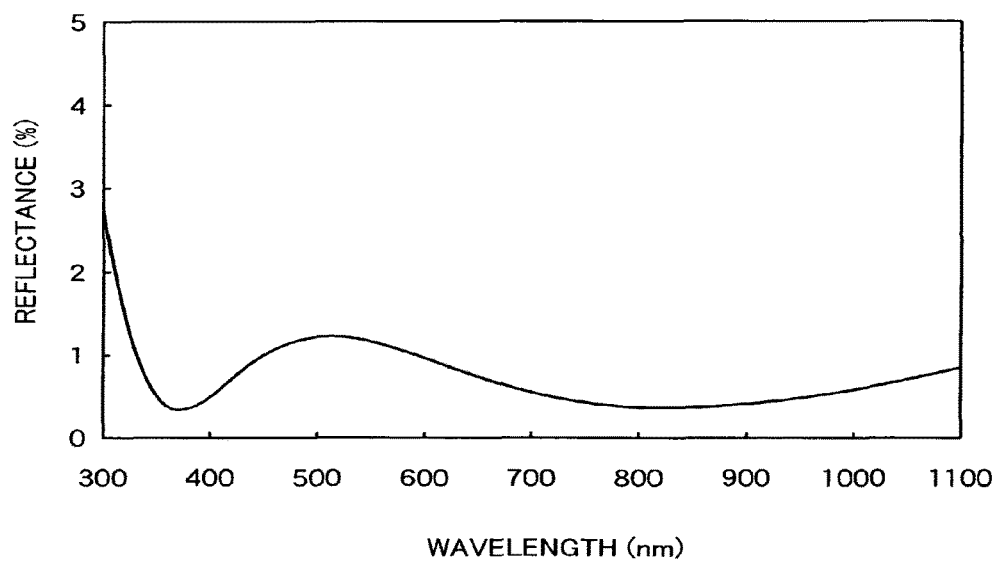
FIG. 7 shows a graph illustrating a spectral reflection characteristic of a multilayered optical thin film of Example 35.

FIG. 7 shows a result of the measurement of the reflectance of the substrate having the antireflection film formed thereon as described above. The difference in the refractive index between the mutually adjoining $MgF_2$—$SiO_2$ films is 0.02 to 0.23. Therefore, the reflectance is not more than about 1% in the entire wavelength region at wavelengths from 350 nm to 1,100 nm. Accordingly, it is appreciated the reflection is low in the wide band ranging from the ultraviolet to the near infrared. According to this result, the antireflection film, which has not been conventionally provided, has been successfully manufactured in accordance with the present invention.

Second Embodiment

Figure 8:
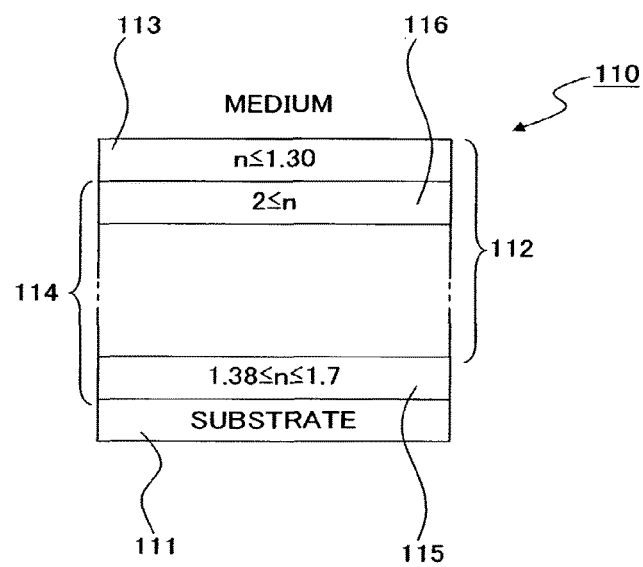
FIG. 8 shows a schematic sectional view illustrating an optical element according to a second embodiment of the present invention.

FIG. 8 shows a structure of an optical element 110 according to the second embodiment.

With reference to FIG. 8, the optical element 110 includes a multilayered antireflection film 112 which includes several, which is not less than three, of several types of layers having different refractive indexes, the layers being disposed on a flat optical surface of a substrate 111. Specifically, the substrate 111 may be formed of, for example, glass or plastic, and may have a form of plate member or lens. The optical surface may be a curved surface.

The multilayered antireflection film 112 is designed so that the uppermost layer 113, which makes contact on the side of a medium, has the refractive index which is set to be not more than 1.30 at the design center wavelength $\lambda_0$; and that the layers 114 other than the uppermost layer are constructed by stacking a layer which has the refractive index of not less than 2 at the design center wavelength $\lambda_0$ and a layer which has the refractive index of 1.38 to 1.7 at the design center wavelength $\lambda_0$.

In the multilayered antireflection film 112, the layer 115, which makes contact with the substrate 111, has the refractive index which is 1.38 to 1.7 at the design center wavelength $\lambda_0$. Further, the second layer 116 as counted from the side of the medium has the refractive index which is set to be not less than 2 at the design center wavelength $\lambda_0$.

Each of the films of the multilayered antireflection film 112 as described above may be formed by any one of the methods selected from the wet process including, for example, the sol-gel method and the like, and from the dry process including the vacuum vapor deposition method, the sputtering method, the ion plating method, the CVD method, and the like. The methods for forming the layers may be different from each other or identical with each other.

The material for the substrate 111 of the optical element 110 of the present invention is not specifically limited provided that the material is an optical base material, and is preferably applicable to the optical element 110 such as the lens, the prism, the filter and the like. The optical element 110 as described above improves the optical performance of the optical system in which the optical element 110 is incorporated. Further, the optical element 110 improves the performance of the optical device which is provided with the optical system.

The optical element 110 as described above can be incorporated into any one of the optical elements L1 to L12 of the imaging optical system 118 explained with reference to FIG. 2 in the first embodiment. That is, the multilayered antireflection film 112 is formed on one or both surfaces of a part or all of the plurality of optical elements L1 to L12. In this case, the antireflection films 112 are applied, for example, to the surfaces X, Y to which the flat surface and/or the concave surface is directed or opposite as viewed from the aperture diaphragm P of the optical system.

In the case of the imaging optical system 118 as described above, Rn×Rm≤0.002% is satisfied in the entire visible region provided that Rn represents a reflectance of normal incidence on an n-th ghost-generating surface in the optical system, and Rm represents a reflectance of normal incidence on an m-th ghost-generating surface. The multilayered antireflection film 112 is applied to at least one surface of the n-th and m-th ghost-generating surfaces. The imaging optical system 118 is used in a wavelength region ranging from 400 nm to 700 nm.

In the case of the imaging optical system 118 as described above, the multilayered antireflection film 112 is constructed as follows. That is, three or more of the several types of layers having different refractive indexes are stacked. The uppermost layer 113, which makes contact on the side of the medium, has the refractive index which is not more than 1.30 at the design center wavelength $\lambda_0$; and the layers 114 other than the uppermost layer are constructed by stacking a layer which has the refractive index of not less than 2 at the design center wavelength $\lambda_0$ and a layer which has the refractive index of 1.38 to 1.7 at the design center wavelength $\lambda_0$. Therefore, the wavelength band characteristic and the incident angle characteristic are remarkably improved, and the reflectance can be suppressed to be low with respect to the light allowed to come in a wide angle range. Further, the reflectance can be suppressed to be low over a wide wavelength region.

The layer 115, which makes contact with the substrate 111, has the refractive index which is 1.38 to 1.7 at the design center wavelength $\lambda_0$. Further, the second layer 116 as counted from the side of the medium has the refractive index which is not less than 2 at the design center wavelength $\lambda_0$. Therefore, it is possible to further suppress the reflectance to be low.

The optical element 110 has the multilayered antireflection film 112 provided on the substrate 111. Therefore, it is possible to obtain the optical element 110 in which the reflectance can be suppressed to be low with respect to the light allowed to come in a wide angle range, and the reflectance can be suppressed to be low over a wide wavelength region.

Further, even when the substrate 111 has any curved surface, without being limited to only the plane-parallel, then the reflectance can be suppressed to be low with respect to the light allowed to come in a wide angle range, and the reflectance can be suppressed to be low over a wide wavelength region. In this case, the ghost, which would be generated on the surface on the image side of the plane-parallel F positioned on the side nearest to the object of the imaging optical system 118, can be avoided more effectively by forming the multilayered antireflection film 112 on the surface. The more excellent optical performance including, for example, the reflection characteristic and the like can be achieved with a smaller number of the arranged multilayered antireflection films 112, because the multilayered antireflection film 112 is provided on the surface on which the ghost would be otherwise generated.

The reflectance is suppressed to be low for the optical element 110 provided with the multilayered antireflection film 112 of the present invention. Therefore, when the optical element 110 is adopted for at least one of the plurality of optical elements L1 to L12 of the imaging optical system 118, the imaging optical system 118 can form an image in which the ghost and the flare are suppressed.

Further, Rn×Rm≤0.002% is satisfied (in the entire visible region) provided that Rn represents a reflectance of normal incidence on an n-th ghost-generating surface in the optical system, and Rm represents a reflectance of normal incidence on an m-th ghost-generating surface. Therefore, the imaging optical system 118 can form an image in which the ghost and the flare are further suppressed.

Furthermore, the multilayered antireflection film 112 is applied to at least one surface of the n-th and m-th ghost-generating surfaces. Therefore, the imaging optical system 118 can form an image in which the ghost and the flare are further suppressed.

If the reflectances Rn, Rm of the normal incidence on the n-th and m-th ghost-generating surfaces is Rn×Rm>0.002% in the visible light region, there is such a possibility that the ghost and the flare may be generated conspicuously, and any obtained image may be deteriorated in quality.

The multilayered antireflection film 112 is applied to the surface to which the flat surface or the concave surface is opposite as viewed from the aperture diaphragm P of the optical system. Therefore, an image, in which the ghost and the flare are further suppressed, can be obtained more effectively with the optical system. In other words, if the reflection is caused on the surface to which the flat surface or the concave surface is opposite as viewed from the aperture diaphragm P of the optical system, the image is affected more greatly as compared with any case in which the reflection is caused on any other surface. Therefore, when the multilayered antireflection film 112 is provided on the surface to suppress the reflection, it is possible to obtain an image in which the ghost and the flare are further suppressed more effectively, as compared with any case in which the multilayered antireflection film 112 is provided on any other surface.

Further, the reflectance can be further lowered for the optical system which is used in the wavelength region from 400 nm to 700 nm. Even when an observation optical system, which has an ocular lens provided on the side of the image plane of the imaging optical system 118, is provided and used, the multilayered antireflection film 112 can exhibit the same or equivalent effect. Accordingly, it is possible to observe a sharp image in which the ghost and the flare are suppressed.

Examples of the second embodiment will be explained below.

Example 36

Figure 9:
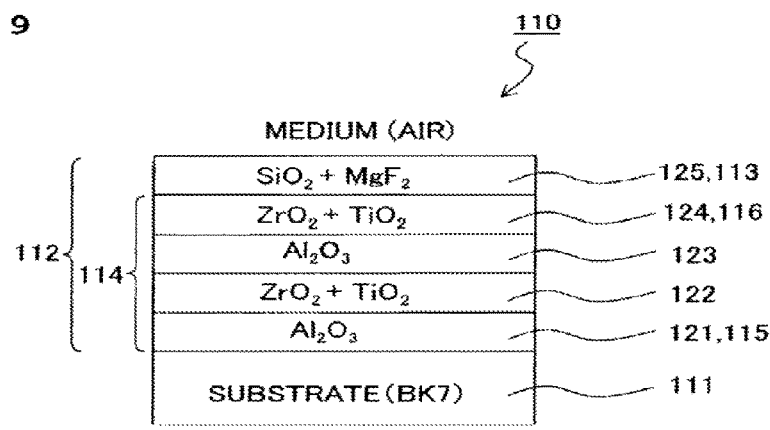
FIG. 9 shows a schematic sectional view illustrating an optical element of Example 36 of the present invention.

As shown in FIG. 9, a film of Example 36 is provided as a wide band multilayered antireflection film 112 formed of five layers, in which the low reflectance is realized in the entire visible region. The film of Example 36 is constructed as shown in Table 6.

TABLE 6

|  | Substance | Refractive index | Optical film thickness |
| --- | --- | --- | --- |
| Medium | air | | |
| Fifth layer | $SiO_2 + MgF_2$ | 1.26 | $0.269\lambda_0$ |
| Fourth layer | $ZrO_2 + TiO_2$ | 2.12 | $0.043\lambda_0$ |
| Third layer | $Al_2O_3$ | 1.65 | $0.217\lambda_0$ |
| Second layer | $ZrO_2 + TiO_2$ | 2.12 | $0.066\lambda_0$ |
| First layer | $Al_2O_3$ | 1.65 | $0.290\lambda_0$ |
| Substrate | BK7 | 1.52 | |

In this case, the wavelength 550 nm is the design center wavelength $\lambda_0$, and the medium is the air. The substrate 111 is borosilicate crown optical glass (BK7) having a refractive index of 1.52 at $\lambda_0$. The stacked structure is designed optimally for the substrate 111. That is, the multilayered antireflection film 112 is composed of five layers. The first layer 121 (layer 115 which makes contact with the substrate 111), which is most closely to the substrate 111, is formed of aluminum oxide ($Al_2O_3$). The first layer 121 is formed such that the refractive index is 1.65 (refractive index of 1.38 to 1.7), and the optical film thickness is $0.290\lambda_0$.

The second layer 122 is formed of a mixed layer ($ZrO_2 + TiO_2$) composed of zirconium oxide and titanium oxide, and is formed such that the refractive index is 2.12 (refractive index of not less than 2), and the optical film thickness is $0.066\lambda_0$.

The third layer 123 is formed of aluminum oxide ($Al_2O_3$), and is formed such that the refractive index is 1.65 (refractive index of 1.38 to 1.7), and the optical film thickness is $0.217\lambda_0$.

The fourth layer 124 (second layer 116 as counted from the side of the medium) is formed of a mixed layer ($ZrO_2 + TiO_2$) composed of zirconium oxide and titanium oxide, and is formed such that the refractive index is 2.12 (refractive index of not less than 2), and the optical film thickness is $0.043\lambda_0$.

The fifth layer 125 (uppermost layer 113 which makes contact on the side of the medium) is formed of a mixed layer ($SiO_2 + MgF_3$) composed of silica and magnesium fluoride, and is formed such that the refractive index is 1.26 (refractive index of not more than 1.30), and the optical film thickness is $0.269\lambda_0$.

As described above, the first and third layers 121, 123 are the intermediate refractive index layers (refractive indexes are not less than 1.38 and not more than 1.7), the second and fourth layers 122, 124 are the high refractive index layers (refractive indexes are not less than 2), and the fifth layer 125 is the low refractive index layer (refractive index is not more than 1.30).

Figure 10:
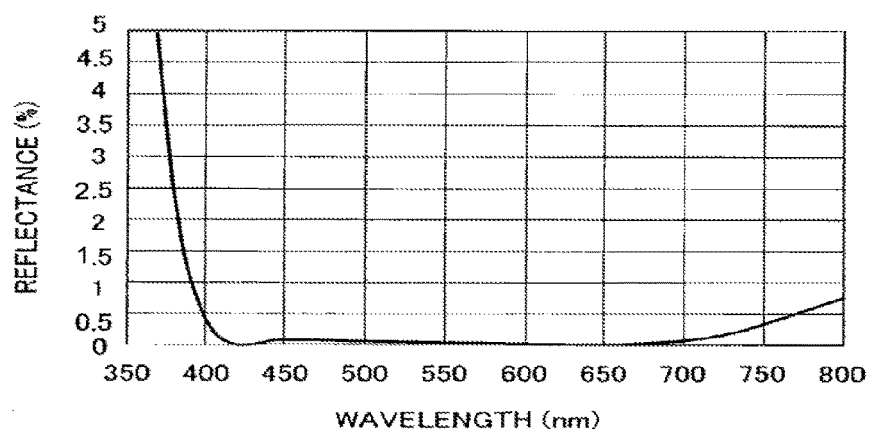
FIG. 10 shows a graph illustrating a relationship between wavelength and reflectance when a light comes into a multilayered antireflection film concerning Example 36 of the present invention.
Figure 11:
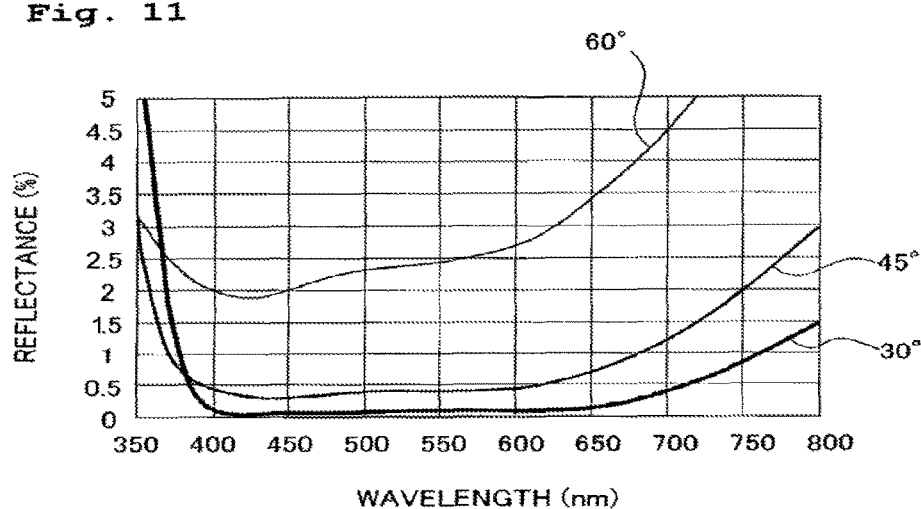
FIG. 11 shows a graph illustrating the relationship between the wavelength and the reflectance when the light comes into the multilayered antireflection film concerning Example 36 of the present invention at angles of 30 degrees, 45 degrees, and 60 degrees.

The multilayered antireflection film having the structure as described above has the following spectral reflectance characteristic as obtained upon the normal incidence as shown in FIG. 10. That is, it is appreciated that the reflectance is suppressed to be not more than 0.2% over the entire wavelength region from about 420 nm to 720 nm. Further, FIG. 11 shows the spectral reflection characteristics obtained when the angle of incidence is 30 degrees, 45 degrees, and 60 degrees. The spectral reflectance characteristic was measured in the second embodiment by using a spectral reflectance measuring instrument U-4000 produced by Hitachi.

Comparative Example 5

Table 7 shows a construction of a multilayered wide band antireflection film based on the conventional technique in which the same medium and the same substrate were used, in comparison with Example 36.

TABLE 7

|  | Substance | Refractive index | Optical film thickness |
| --- | --- | --- | --- |
| Medium | air | | |
| Seventh layer | $MgF_2$ | 1.39 | $0.243\lambda_0$ |
| Sixth layer | $ZrO_2 + TiO_2$ | 2.12 | $0.119\lambda_0$ |
| Fifth layer | $Al_2O_3$ | 1.65 | $0.057\lambda_0$ |
| Fourth layer | $ZrO_2 + TiO_2$ | 2.12 | $0.220\lambda_0$ |
| Third layer | $Al_2O_3$ | 1.65 | $0.064\lambda_0$ |
| Second layer | $ZrO_2 + TiO_2$ | 2.12 | $0.057\lambda_0$ |
| First layer | $Al_2O_3$ | 1.65 | $0.193\lambda_0$ |
| Substrate | BK7 | 1.52 | |

Figure 12:
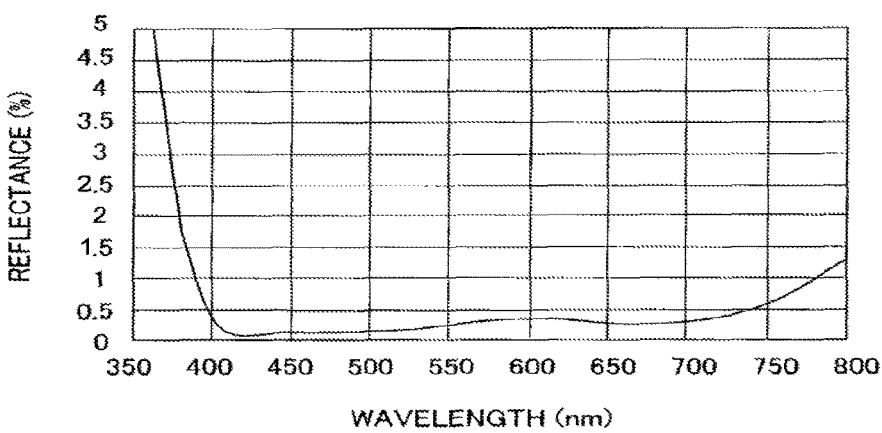
FIG. 12 shows a graph corresponding to FIG. 10 concerning Comparative Example 5 in comparison with Example 36 of the present invention.
Figure 13:
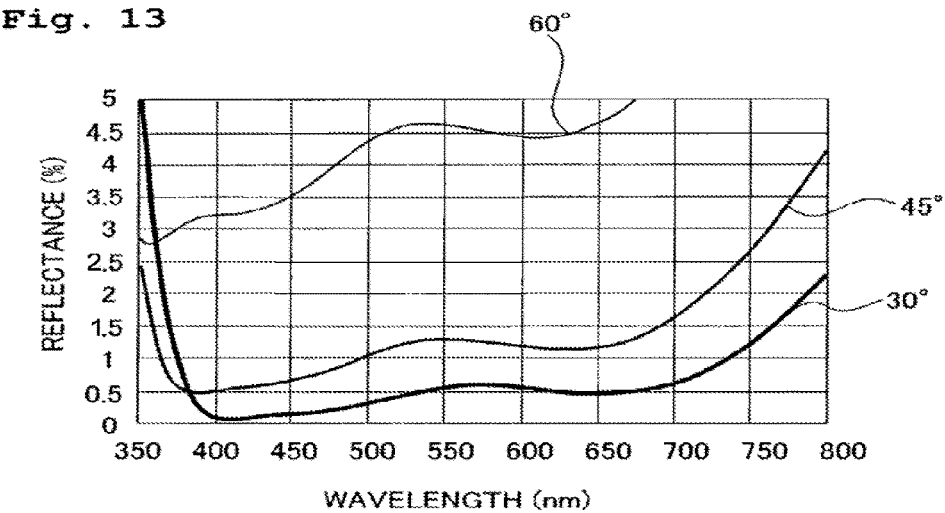
FIG. 13 shows a graph corresponding to FIG. 11 concerning Comparative Example 5 in comparison with Example 36.

FIG. 12 shows a spectral reflection characteristic of this multilayered antireflection film upon the normal incidence. Similarly, FIG. 13 shows spectral reflection characteristics at angles of incidence of 30 degrees, 45 degrees, and 60 degrees at which the light is allowed to come into the multilayered antireflection film.

When Example 36 is compared with Comparative Example 5, the reflectance of the antireflection film of Example 36 is as follows. That is, the reflectance upon the normal incidence is reduced by not less than ½ at some portions as compared with the conventional technique. The extremely satisfactory antireflection performance is provided over the entire region. It is clear that the antireflection performance, in which the reflectance is extremely lower than that of the antireflection film of the conventional technique, is obtained when the angle of incidence is further increased.

Example 37

In Example 37, as shown in Table 8, multilayered antireflection films 112, each of which is formed of seven layers, are provided. The antireflection films 112 are applied to a plurality of substrates 111 having different refractive indexes.

TABLE 8

| | Substance | Refractive index | Optical film thickness | Optical film thickness | Optical film thickness | Optical film thickness |
|---|---|---|---|---|---|---|
| Medium | air | 1 | | | | |
| Seventh layer | $SiO_2 + MgF_2$ | 1.26 | $0.275\lambda_0$ | $0.268\lambda_0$ | $0.271\lambda_0$ | $0.269\lambda_0$ |
| Sixth layer | $ZrO_2 + TiO_2$ | 2.12 | $0.045\lambda_0$ | $0.057\lambda_0$ | $0.054\lambda_0$ | $0.059\lambda_0$ |
| Fifth layer | $Al_2O_3$ | 1.65 | $0.212\lambda_0$ | $0.171\lambda_0$ | $0.178\lambda_0$ | $0.162\lambda_0$ |
| Fourth layer | $ZrO_2 + TiO_2$ | 2.12 | $0.077\lambda_0$ | $0.127\lambda_0$ | $0.13\lambda_0$ | $0.158\lambda_0$ |
| Third layer | $Al_2O_3$ | 1.65 | $0.288\lambda_0$ | $0.122\lambda_0$ | $0.107\lambda_0$ | $0.08\lambda_0$ |
| Second layer | $ZrO_2 + TiO_2$ | 2.12 | 0 | $0.059\lambda_0$ | $0.075\lambda_0$ | $0.105\lambda_0$ |
| First layer | $Al_2O_3$ | 1.65 | 0 | $0.257\lambda_0$ | $0.03\lambda_0$ | $0.03\lambda_0$ |
| Refractive index of substrate | | | 1.46 | 1.62 | 1.74 | 1.85 |
| Corresponding Fig. | | | FIG. 8 | FIG. 9 | FIG. 10 | FIG. 11 |

That is, the multilayered antireflection films 112 were designed for four types of the substrates 111 having the refractive indexes of 1.46, 1.62, 1.74, and 1.85 at a wavelength of 550 nm. The respective designed values are shown in Table 8.

Figure 14:
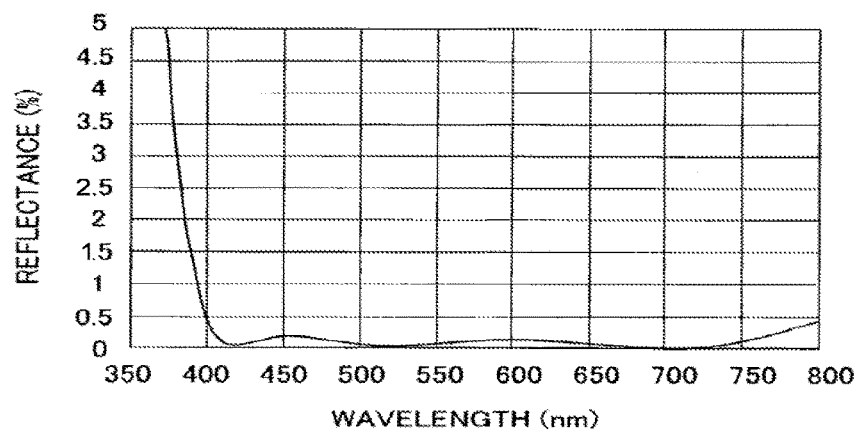
FIG. 14 shows a graph corresponding to FIG. 10 in a case that a substrate according to Example 37 of the present invention has a refractive index of 1.46.
Figure 15:
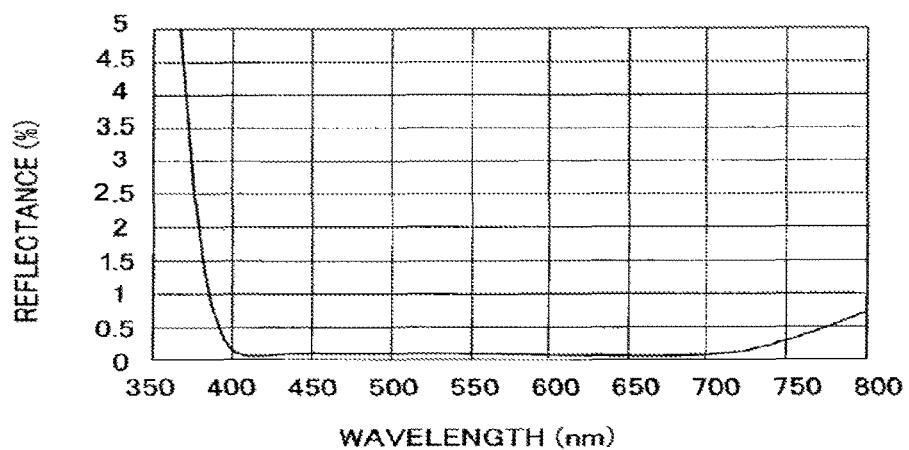
FIG. 15 shows a graph corresponding to FIG. 10 in a case that the substrate according to Example 37 of the present invention has a refractive index of 1.62.
Figure 16:
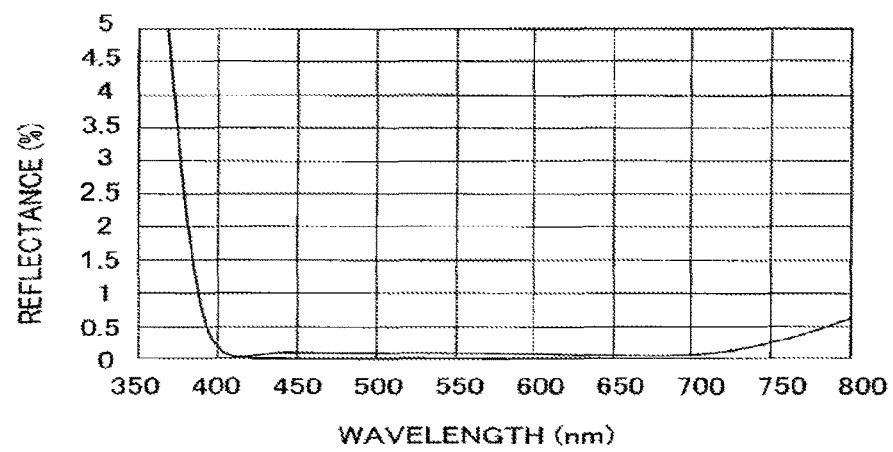
FIG. 16 shows a graph corresponding to FIG. 10 in a case that the substrate according to Example 37 of the present invention has a refractive index of 1.74 n.
Figure 17:
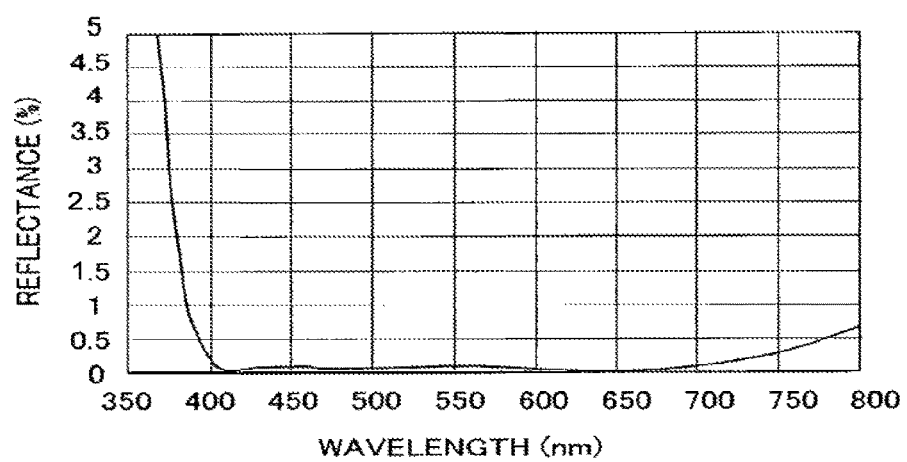
FIG. 17 shows a graph corresponding to FIG. 10 in a case that the substrate according to Example 37 of the present invention has a refractive index of 1.85.

FIG. 14 shows a spectral reflection characteristic for the substrate 111 having the refractive index of 1.46. FIG. 15 shows a spectral reflection characteristic for the substrate 111 having the refractive index of 1.62. FIG. 16 shows a spectral reflection characteristic for the substrate 111 having the refractive index of 1.74. FIG. 17 shows a spectral reflection characteristic for the substrate 111 having the refractive index of 1.85. According to these drawings, it is appreciated that the reflectance is suppressed to be not more than about 0.2% over the entire wavelength region from about 420 nm to about 720 nm.

As described above, even when the refractive index of the substrate 111 differs, the satisfactory antireflection performance, in which the reflectance is low over the wide band or region, can be obtained with the five to seven layers in total by optimizing the film thickness of each of the layers, without drastically altering the basic construction.

As described above, the multilayered antireflection films 112 obtained in Examples 36 and 37 exhibit the low reflectance characteristic with respect to the incoming light in the visible region and the allowance for the wide angle characteristic.

INDUSTRIAL APPLICABILITY

The $MgF_2$ optical thin film of the present invention realizes the low reflectance in the wide angle range in the visible light region (400 nm to 800 nm). When the optical element, which is provided with the $MgF_2$ optical thin film as described above, is used for the optical system, it is possible to provide the optical system having the high optical performance in which the ghost and the flare are scarcely caused.

The extraordinary low refractive index layer is introduced into the construction of the multilayered antireflection film, and the arrangement of the extraordinary low refractive index layer and the arrangement of other layers are optimized. Accordingly, it is possible to realize the multilayered antireflection film having the extremely excellent performance which cannot be realized by any conventional multilayered antireflection film. Therefore, the optical element and the optical system of the present invention are extremely useful for a variety of ways of use including, for example, not only the optical instrument having the high resolution such as the camera, the microscope, the binoculars, the exposure apparatus and the like but also the display such as the liquid crystal display device, the plasma display and the like, the window glass, the show window, and the like.

The invention claimed is:

1. An optical system comprising a plurality of optical elements which are arranged between an object and an image plane,
   wherein at least one of the plurality of optical elements comprises:
   a base material; and
   an optical thin film which is applied to at least one of optical surfaces of the base material,
   wherein the optical thin film comprises:
   $MgF_2$ minute particles; and
   an amorphous silicon oxide-based binder which exists between the $MgF_2$ minute particles,
   wherein the at least one of the optical surfaces is formed to have one of a flat surface and a curved surface, and
   wherein the optical system is an imaging optical system or an observation optical system, and
   wherein $Rn \times Rm \leq 0.002\%$ holds in an entire visible region provided that Rn represents a reflectance of normal incidence on an n-th ghost-generating surface in the optical system, and Rm represents a reflectance normal incidence on an m-th ghost-generating surface.

2. The optical system according to claim 1, wherein the optical thin film is applied to at least one of the n-th and m-th ghost-generating surfaces.

3. The optical system according to claim 1, wherein the optical thin film is applied to a surface to which a flat surface or a concave surface is opposite as viewed from a diaphragm of the optical system.

4. The optical system according to claim 1, wherein the at least one of the optical surfaces of the base material is formed to have the curved surface form having such a shape that (effective lens diameter D)/(lens curvature radius R) is 0.5 to 2.

5. The optical system according to claim 1, wherein the $MgF_2$ minute particles are connected by the amorphous silicon oxide-based binder, and the amorphous silicon oxide-based binder, disposed on surfaces of $MgF_2$ minute particles, among the $MgF_2$ minute particles, which exist at an outermost portion of the optical thin film, has a thickness which is not more than 5% of a wavelength of light to be radiated.

6. The optical system according to claim 1, wherein the $MgF_2$ minute particles have an average particle diameter of 1 nm to 100 nm.

7. The optical system according to claim 1, wherein the optical thin film has a porous structure.

8. The optical system according to claim 7, wherein the porous structure has a percentage of voids of not more than 50%.

9. The optical system according to claim 1, wherein the amorphous silicon oxide-based binder is formed of amorphous silica.

10. The optical system according to claim 1, wherein a multilayered optical thin film comprising a plurality of stacked optical thin films is applied to the at least one of optical surfaces of the base material, and the optical thin film is formed as an outermost layer of the stacked optical thin films.

11. The optical system according to claim 10, wherein the multilayered optical thin film is applied to at least one of the n-th and m-th ghost-generating surfaces.

12. The optical system according to claim 10, wherein the multilayered optical thin film is applied to a surface to which a flat surface or a concave surface is opposite as viewed from a diaphragm of the optical system.

13. The optical system according to claim 1, wherein the optical thin film is formed by using a sol solution in which $MgF_2$ minute particles are dispersed and a binder solution which forms the amorphous silicon oxide-based binder.

14. The optical system according to claim 1, wherein, in the optical thin film, the amorphous silicon oxide-based binder exists in an amount of 10% by weight to 30% by weight with respect to the $MgF_2$ minute particles.

15. The optical system according to claim 10, wherein the outermost layer of the multi-layered optical thin film is the optical thin film having a refractive index of not more than 1.30, and an underlying film is a $MgF_2$ optical film formed by a dry process.

16. A zoom lens comprising the optical system according to claim 1.

17. A camera comprising the zoom lens according to claim 16.

* * * * *